(12) United States Patent
Motoyoshi et al.

(10) Patent No.: US 10,778,077 B2
(45) Date of Patent: Sep. 15, 2020

(54) SYNCHRONOUS LINEAR MOTOR

(71) Applicant: MITSUBISHI ELECTRIC CORPORATION, Chiyoda-ku (JP)

(72) Inventors: Kenta Motoyoshi, Chiyoda-ku (JP); Ariff Zaini, Chiyoda-ku (JP); Kazumasa Ito, Chiyoda-ku (JP); Toshinori Tanaka, Chiyoda-ku (JP); Shinichi Yamaguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 39 days.

(21) Appl. No.: 16/078,977

(22) PCT Filed: Jan. 26, 2017

(86) PCT No.: PCT/JP2017/002697
§ 371 (c)(1),
(2) Date: Aug. 22, 2018

(87) PCT Pub. No.: WO2017/169046
PCT Pub. Date: Oct. 5, 2017

(65) Prior Publication Data
US 2019/0036437 A1 Jan. 31, 2019

(30) Foreign Application Priority Data

Mar. 29, 2016 (JP) .................................. 2016-066218

(51) Int. Cl.
*H02K 41/03* (2006.01)
*H02K 1/14* (2006.01)
(Continued)

(52) U.S. Cl.
CPC ........... *H02K 41/031* (2013.01); *H02K 1/148* (2013.01); *H02K 1/16* (2013.01); *H02K 21/02* (2013.01);
(Continued)

(58) Field of Classification Search
CPC ...... H02K 1/2706; H02K 21/26; H02K 21/38; H02K 41/03; H02K 41/031; H02K 41/033;
(Continued)

(56) References Cited

U.S. PATENT DOCUMENTS 7,952,237 B2 * 5/2011 Matscheko .......... H02K 41/033
310/12.18
2002/0117903 A1 * 8/2002 Uchida ............... G03F 7/70758
310/12.24
(Continued)

FOREIGN PATENT DOCUMENTS

DE 10 2004 045 992 A1 4/2006
DE 10 2006 035 674 A1 2/2008
(Continued)

OTHER PUBLICATIONS

Korean Office Action dated Oct. 11, 2019 in Patent Application No. 10-2018-7027416 (with English translation), 9 pages.
(Continued)

*Primary Examiner* — Tulsidas C Patel
*Assistant Examiner* — Ahmed Elnakib
(74) *Attorney, Agent, or Firm* — Xsensus LLP

(57) ABSTRACT

A synchronous linear motor, including: a stator including projecting poles including magnetic bodies; and a movable element arranged opposed to the projecting poles through a space. The movable element includes a core with a magnetic body, coils, and permanent magnets arrayed along a moving direction. The core includes core backs and teeth projecting from the core backs toward the projecting poles. The coils are at least wound around the teeth on both end sides in the moving direction. The permanent magnets are arranged at center portions of the teeth along a projecting direction of the teeth. A polarity of a magnetic pole of the permanent
(Continued)

magnet is the same as a polarity of an opposed magnetic pole in an adjacent permanent magnet. The number of different shapes of the permanent magnets or the number of different magnetic characteristics of the permanent magnets is two or more.

19 Claims, 11 Drawing Sheets

(51) Int. Cl.
    *H02K 1/16*         (2006.01)
    *H02K 21/02*      (2006.01)

(52) U.S. Cl.
    CPC .......... *H02K 41/03* (2013.01); *H02K 2201/03* (2013.01)

(58) Field of Classification Search
    CPC .......... H02K 21/44; H02K 21/02; H02K 1/16; H02K 1/148; H02K 2201/03; H02K 1/14; B66B 11/0407
    USPC .......... 310/12.01, 12.24, 12.26, 12.25, 12.18, 310/49.46, 181, 166, 168, 171, 254.1
    See application file for complete search history.

(56) References Cited

U.S. PATENT DOCUMENTS

| | | | |
|---|---|---|---|
| 2007/0222304 A1 | 9/2007 | Jajtic et al. | |
| 2009/0206682 A1* | 8/2009 | Jajtic | H02K 41/033 310/12.24 |
| 2013/0249324 A1* | 9/2013 | Gandhi | H02K 41/033 310/12.18 |
| 2016/0297647 A1* | 10/2016 | Tangudu | B66B 11/0407 |
| 2018/0294706 A1* | 10/2018 | Hakala | H02K 41/031 |

FOREIGN PATENT DOCUMENTS

| | | |
|---|---|---|
| JP | 11-332210 A | 11/1999 |
| JP | 2008-514175 A | 5/2008 |
| JP | 2009-195103 A | 8/2009 |
| JP | 2009-195104 A | 8/2009 |
| JP | 2012-178955 A | 9/2012 |
| KR | 10-2008-0010739 A | 1/2008 |

OTHER PUBLICATIONS

International Search Report dated Apr. 18, 2017 in PCT/JP2017/002697 filed Jan. 26, 2017.

Office Action dated Jan. 31, 2020 in German Patent Application No. 11 2017 001 733.5 (with English translation), 12 pages.

* cited by examiner

SYNCHRONOUS LINEAR MOTOR

TECHNICAL FIELD

This invention relates to a synchronous linear motor, which includes a stator and a movable element opposed to the stator.

BACKGROUND ART

In recent years, there have been increasing demands for higher speed and high-accuracy positioning with respect to an actuator which is to be used for, for example, a table feeder of a machine tool or a conveyor of a semiconductor manufacturing device. Therefore, in many cases, a linear motor is used for, for example, a machine tool or a semiconductor manufacturing device. Moreover, the linear motor is used in direct drive of driving a device without intermediation of a transmission. Thus, as compared to a drive system of converting a rotary mechanism, which is formed of a combination of a rotary servomotor and a ball screw, into a linear motion, there is no degradation in stiffness of the ball screw due to backlash, and high responsiveness can be achieved. Therefore, high speed, high acceleration, and high-accuracy positioning with the linear motor can be achieved.

A related-art linear motor includes a stator and a movable element, which is opposed to the stator while maintaining a certain space and moves relative to the stator. The movable element has a configuration in which a coil is wound around each of teeth of a plurality of segment cores each formed of a magnetic body. The stator includes an iron core formed of a magnetic body and permanent magnets magnetized in a space direction. The permanent magnets are arranged while maintaining a certain distance along a moving direction of the movable element. Moreover, magnetization directions of adjacent permanent magnets are different from each other.

In a conveyor including the above-mentioned linear motor, the number of permanent magnets increases as a moving distance of the movable element increases. Therefore, cost is liable to increase. In order to suppress the increase in cost, the permanent magnets which have hitherto been arranged on the stator are arranged on the teeth of the segment cores of the movable element. Moreover, there has been known a linear motor including a movable element having a configuration in which a coil is wound around each of segment cores and a stator including an iron core having projecting poles (see, for example, Patent Literatures 1 and 2).

CITATION LIST

Patent Literature

[PTL 1] JP 2009-195104 A
[PTL 2] JP 2009-195103 A

SUMMARY OF INVENTION

Technical Problem

In the linear motors disclosed in Patent Literatures 1 and 2, auxiliary segment cores having permanent magnets arranged thereon and having no coil wound therearound are arranged on both end sides of the movable element in a moving direction of the movable element. Further, a shape of each of the permanent magnets arranged on the auxiliary segment cores and a shape of each of the permanent magnets arranged on the segment cores having coils wound therearound are different from each other. Moreover, a length of a space between each of the auxiliary segment cores and the stator and a length of a space between each of the segment cores having coils wound therearound and the stator are different from each other. With such configurations, a cogging thrust generated between the permanent magnets and the core of the movable element is reduced.

However, there is a problem in that the auxiliary segment cores arranged on both end sides of the movable element in the moving direction cause the increase in body size of the movable element, which represents a volume of the movable element, with the result that a stroke being a movable range of the movable element in the moving direction is reduced.

Moreover, there is a problem in that a mass of the movable element is increased by the amount corresponding to the auxiliary segment cores, and a thrust density that is a value obtained by dividing a thrust of the linear motor by the mass of the movable element is reduced, with the result that acceleration is also reduced.

This invention has been made to solve the problems described above, and has an object to obtain a synchronous linear motor capable of reducing a cogging thrust while suppressing reduction in stroke caused by increase in body size of a movable element and suppressing reduction in thrust density caused by increase in mass of the movable element.

Solution to Problem

According to one embodiment of this invention, there is provided a synchronous linear motor, including: a stator including a base portion and a plurality of projecting poles, the plurality of projecting poles projecting from the base portion and being formed of magnetic bodies; and a movable element, which is arranged opposed to the plurality of projecting poles through a space, wherein the plurality of projecting poles are arranged apart from one another along a moving direction of the movable element, wherein the movable element includes a core formed of a magnetic body, a plurality of coils, and a plurality of permanent magnets arrayed along the moving direction, wherein the core includes core backs and a plurality of teeth, the plurality of teeth projecting from the core backs toward the projecting poles and being arrayed along the moving direction, wherein the plurality of coils are at least wound around the teeth on both end sides in the moving direction, wherein the plurality of permanent magnets are arranged at center portions of the teeth along a projecting direction of the teeth, wherein a polarity of a magnetic pole of the permanent magnet is the same as a polarity of an opposed magnetic pole in an adjacent permanent magnet, and wherein the number of different shapes of the plurality of permanent magnets or the number of different magnetic characteristics of the plurality of permanent magnets is two or more.

Advantageous Effects of Invention

In the synchronous linear motor having the configuration described above, the auxiliary segment cores are not arranged on both end sides of the movable element in the moving direction, thereby being capable of suppressing reduction in stroke caused by increase in body size of the movable element and suppressing reduction in thrust density caused by increase in mass of the movable element. Moreover, the number of different shapes of the plurality of permanent magnets or the number of different magnetic characteristics of the plurality of permanent magnets is two or more. Thus, phases of the cogging thrust generated in the core can be changed, thereby being capable of reducing the cogging thrust generated by the movable element.

DESCRIPTION OF EMBODIMENTS

Now, with reference to the drawings, a synchronous linear motor according to exemplary embodiments of the present invention is described.

First Embodiment

Figure 1:
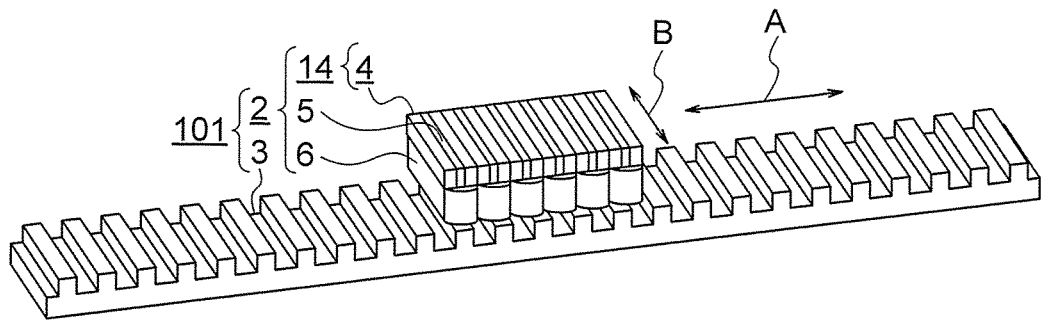
FIG. 1 is a perspective view for illustrating a synchronous linear motor according to a first embodiment of this invention.

FIG. 1 is a perspective view for illustrating a synchronous linear motor according to a first embodiment of this invention. In FIG. 1, a synchronous linear motor 101 includes a movable element 2 and a stator 3. The movable element 2 of the synchronous linear motor 101 is supported by, for example, a slider (not shown).

Thus, the movable element 2 is movable along a moving direction A relative to the stator 3. In FIG. 1, a stacking direction B is a direction perpendicular to the moving direction A of the movable element 2 and to a projecting direction of teeth 7.

The movable element 2 includes six segment cores 4, six permanent magnets 5, and six coils 6. The six segment cores 4 are each formed of a magnetic body constructed as a stacked iron core that is formed by stacking electromagnetic steel plates along the stacking direction B. The six permanent magnets 5 are arranged in the six segment cores 4, respectively. The six coils 6 are wound around the six segment cores 4, respectively. The six permanent magnets 5 are arrayed along the moving direction A. Moreover, the six segment cores 4 are arrayed along the moving direction A to form a core 14 formed of a magnetic body.

That is, the movable element 2 includes the core 14 formed of the magnetic body, the plurality of coils 6, and the plurality of permanent magnets 5 arrayed along the moving direction A. Further, the core 14 is formed of the plurality of segment cores 4 arrayed along the moving direction A.

Figure 2:
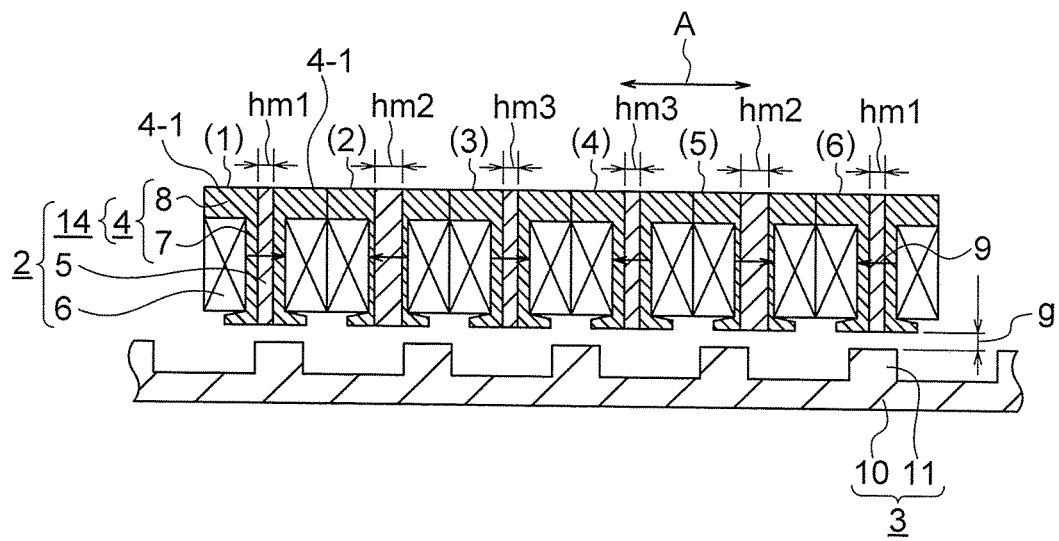
FIG. 2 is a sectional view for illustrating the synchronous linear motor according to the first embodiment of this invention, which is taken along a direction perpendicular to a stacking direction of electromagnetic steel plates.

FIG. 2 is a sectional view for illustrating the synchronous linear motor according to the first embodiment, which is taken along the direction perpendicular to the stacking direction of the electromagnetic steel plates. That is, FIG. 2 is a vertical sectional view of FIG. 1, which is taken along the moving direction A perpendicular to the stacking direction B. This similarly applies in the following description. In FIG. 2, the synchronous linear motor 101 includes the stator 3 and the movable element 2. The stator 3 includes a base portion 10 and a plurality of projecting poles 11. The plurality of projecting poles 11 project from the base portion 10 and are formed of magnetic bodies. The movable element 2 is arranged opposed to the plurality of projecting poles 11 through a gap "g" being a space. The gap "g" represents a minimum distance between the movable element 2 and the stator 3, and is constant along the moving direction A.

The synchronous linear motor 101 is a synchronous linear motor of a winding wire magnet movable element type in which the coils 6 being winding wires and the permanent magnets 5 are arranged on the movable element 2.

On the stator 3, the plurality of projecting poles 11 are arranged apart from one another at predetermined intervals along the moving direction A of the movable element 2.

In the movable element 2, the six segment cores 4 each include a core back 8 and the tooth 7 projecting from the core back 8 toward the projecting poles 11 of the stator 3. That is, the core 14 includes the core backs 8 and the plurality of teeth 7 projecting from the core backs 8 toward the projecting poles 11 and being arrayed along the moving direction A. Moreover, the core 14 is divided at the core backs 8 between adjacent teeth 7.

In FIG. 2, for convenience, symbols (1) to (6) are allocated to the segment cores 4 in the order from the left side in the moving direction A. Moreover, the segment cores 4 each are further divided into two pieces at a center portion of the tooth 7 and the core back 8 and includes two half segment cores 4-1. As a result, the six segment cores 4 are formed of twelve half segment cores 4-1. The half segment cores 4-1 each are formed of a half of the core back 8 and a half of the tooth 7 divided in the right-and-left direction at the center portion of a width in the moving direction A. The core back 8 is held in contact with another core back 8 of an adjacent segment core 4 on a surface perpendicular to the moving direction A, and the core backs 8 are fixed to each other by, for example, welding. The one coil 6 is wound around each of the six teeth 7 in an intensive manner through intermediation of an insulating member such as an insulator (not shown) so that six coils are formed. That is, the plurality of coils 6 are at least wound around the teeth 7 on both end sides in the moving direction A.

Figure 3:
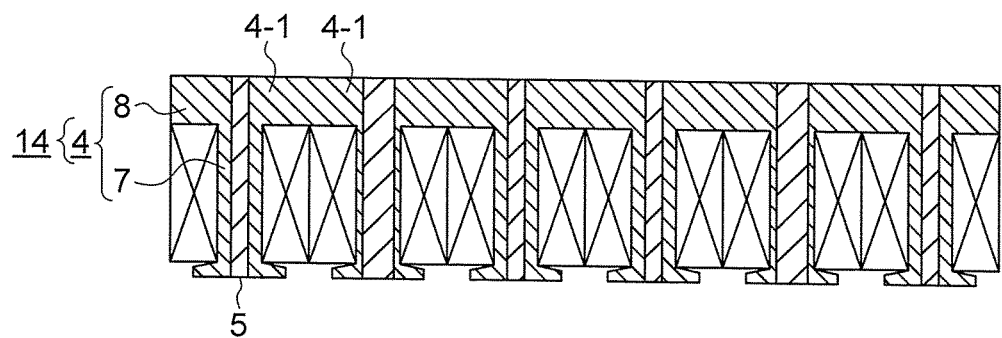
FIG. 3 is a sectional view for illustrating a configuration of the synchronous linear motor according to the first embodiment of this invention in which half segment cores of adjacent segment cores are integrated to each other, which is taken along the direction perpendicular to the stacking direction of the electromagnetic steel plates.

As illustrated in FIG. 3, the core back 8 of one half segment core 4-1 of the segment core 4 and the core back 8 of another half segment core 4-1 of the adjacent segment core 4 may be coupled and integrated to each other. That is, the core 14 is divided at the teeth 7. In this case, the one half segment core 4-1 of the segment core 4 and the another half segment core 4-1 of the adjacent segment core 4 form a new unit of the segment core.

With this configuration, the half segment cores 4-1 of the adjacent segment cores 4 can be coupled to each other. Therefore, positioning accuracy of the adjacent half segment cores 4-1 at the teeth 7 in the moving direction A and in a direction perpendicular to the stacking direction B is improved, and the dimension accuracy of the gap "g" is improved, thereby being capable of suppressing variation in thrust in the synchronous linear motor 101.

Figure 4:
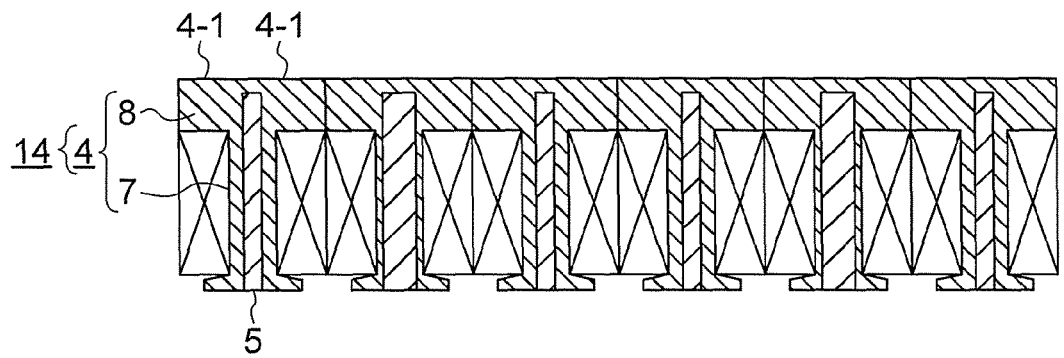
FIG. 4 is a sectional view for illustrating a configuration of the synchronous linear motor according to the first embodiment of this invention in which half segment cores of one segment core are integrated to each other at a core back, which is taken along the direction perpendicular to the stacking direction of the electromagnetic steel plates.
Figure 5:
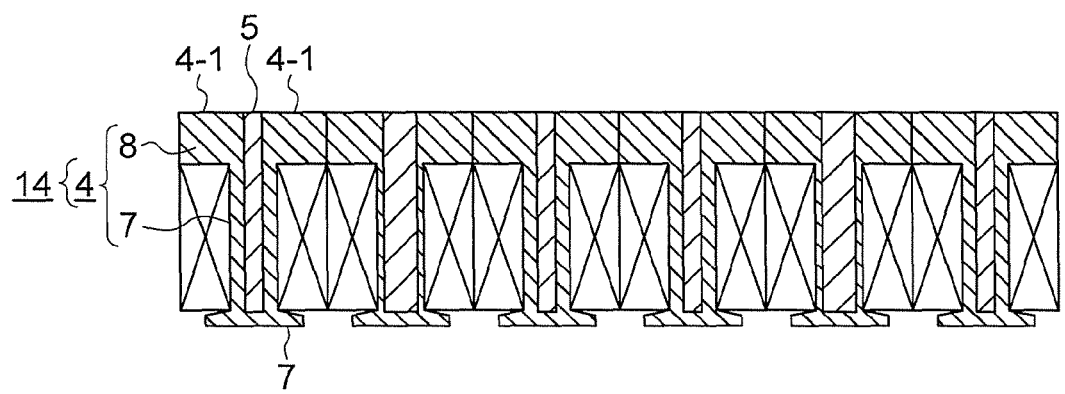
FIG. 5 is a sectional view for illustrating a configuration of the synchronous linear motor according to the first embodiment of this invention in which half segment cores of adjacent segment cores are integrated to each other at teeth distal end portions, which is taken along the direction perpendicular to the stacking direction of the electromagnetic steel plates.

Further, as illustrated in FIG. 4, the core back 8 of one half segment core 4-1 of the segment core 4 and the core back 8 of another half segment core 4-1 of the same segment core 4 may be coupled and integrated to each other to the extent that the leaking magnetic flux of the permanent magnets 5 does not increase. Moreover, as illustrated in FIG. 5, the tooth 7 of one half segment core 4-1 of the segment core 4 and the tooth 7 of another half segment core 4-1 of the same segment core 4 may be coupled and integrated to each other at distal end portions on the core back 8 side and the opposite side to the extent that the leaking magnetic flux of the permanent magnets 5 does not increase.

With this configuration, the half segment cores 4-1 of the same segment core 4 can be coupled to each other. Therefore, positioning accuracy of the half segment cores 4-1 at the teeth 7 in the moving direction A and in the direction perpendicular to the stacking direction B is improved, and the dimension accuracy of the gap "g" is improved, thereby being capable of suppressing variation in thrust in the synchronous linear motor 101. Moreover, a force applied from the half segment cores 4-1 to the permanent magnets 5 in the moving direction A is distributed to the portion at which the half segment cores 4-1 are coupled to each other, and is thus reduced.

The six permanent magnets 5 are arranged at center portions of the teeth 7 so as to extend along the projecting direction of the teeth 7. A magnetization direction 9 of the permanent magnet 5 arranged in the segment core 4 is directed along the moving direction A. The permanent magnets 5 are magnetized so that the polarities of opposed magnetic poles of the permanent magnets 5 arranged in the segment cores 4 have the same polarity. That is, the polarity of the magnetic pole of the permanent magnet 5 is the same as the polarity of the opposed magnetic pole of the adjacent permanent magnet 5. The magnetic poles of the permanent magnet 5 are both end surfaces of the permanent magnet 5 in the magnetization direction 9. The magnetic pole on one end surface in the direction indicated by the arrow of the magnetization direction 9 has the polarity of the N pole, and the magnetic pole on another end surface on the opposite side has the polarity of the S pole.

When there are given a thickness hm1 for each of the permanent magnets 5 arranged in the segment cores 4 located on both end sides in the moving direction A, a thickness hm2 for each of the permanent magnets 5 arranged in the segment cores 4 located second from the both end sides in the moving direction A, and a thickness hm3 for each of the permanent magnets 5 arranged in the segment cores 4 located third from the both end sides in the moving direction A, the relationship of hm1≠hm2 is satisfied. Moreover, the relationship of hm1=hm3 is satisfied. That is, the number of different shapes of the plurality of the permanent magnets 5 is two. In FIG. 2, for the purpose of visually clarifying the difference between the thicknesses hm1 and hm2, illustration is given in such a manner that the difference between the thicknesses hm1 and hm2 is more emphasized than that in FIG. 1.

The two permanent magnets 5 each having the thickness hm1 are arranged in the teeth 7 of the segment cores (1) and (6) being the segment cores 4 located at positions symmetrical with respect to a center of a width of the movable element 2 in the moving direction A, respectively. Moreover, the two permanent magnets 5 each having the thickness hm2 are arranged in the teeth 7 of the segment cores (2) and (5) being the segment cores 4 located at positions symmetrical with respect to the center of the width of the movable element 2 in the moving direction A, respectively. Moreover, the two permanent magnets 5 each having the thickness hm3 are arranged in the teeth 7 of the segment cores (3) and (4) being the segment cores 4 located at positions symmetrical with respect to the center of the width of the movable element 2 in the moving direction A, respectively. That is, the plurality of permanent magnets 5 having the same shape are arranged in the teeth 7 of the segment cores 4 located at positions symmetrical with respect to the center of the width of the movable element 2 in the moving direction A.

Therefore, without need for providing auxiliary iron cores having no coils wound therearound for reducing the cogging thrust at both end sides of the movable element 2, the body size of the movable element 2 of the synchronous linear motor 101, which represents the volume of the movable element 2, can be reduced, thereby being capable of suppressing reduction in stroke of the movable element 2. Moreover, the synchronous linear motor 101 involves no increase in mass corresponding to those of the auxiliary iron cores. Therefore, a thrust density that is a value obtained by dividing a thrust of the linear motor by the mass of the movable element is not reduced, and the acceleration and deceleration are not degraded.

Now, the reduction in cogging thrust, which is an effect of the present invention, is described with reference to analysis results of electromagnetic field analysis.

Figure 6:
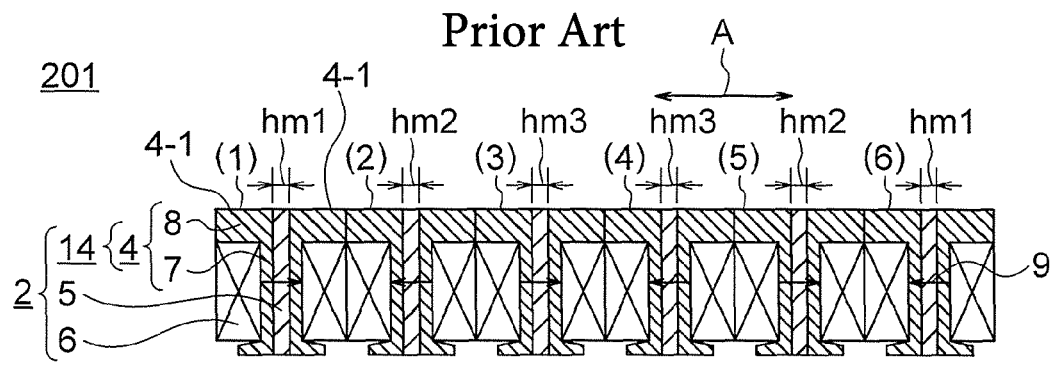
FIG. 6 is a sectional view for illustrating a movable element of a synchronous linear motor in a first comparative example with respect to the synchronous linear motor according to the first embodiment of this invention, which is taken along the direction perpendicular to the stacking direction of the electromagnetic steel plates.

FIG. 6 is a sectional view for illustrating a movable element of a synchronous linear motor in a first comparative example with respect to the synchronous linear motor according to the first embodiment, which is taken along the direction perpendicular to the stacking direction of the electromagnetic steel plates. In FIG. 6, components that are the same as the components of the synchronous linear motor 101 according to the first embodiment are denoted by the same reference symbols. Moreover, in FIG. 6, a first comparative example 201 of the synchronous linear motor is different from the synchronous linear motor 101 according to the first embodiment in the following points. In the first comparative example 201 of the synchronous linear motor, the thicknesses of all of the six permanent magnets 5 in the moving direction A are equal, and the shape and the magnetic characteristic of the six permanent magnets 5 are the same. That is, the relationship of hm1=hm2=hm3 is satisfied.

Figure 7:
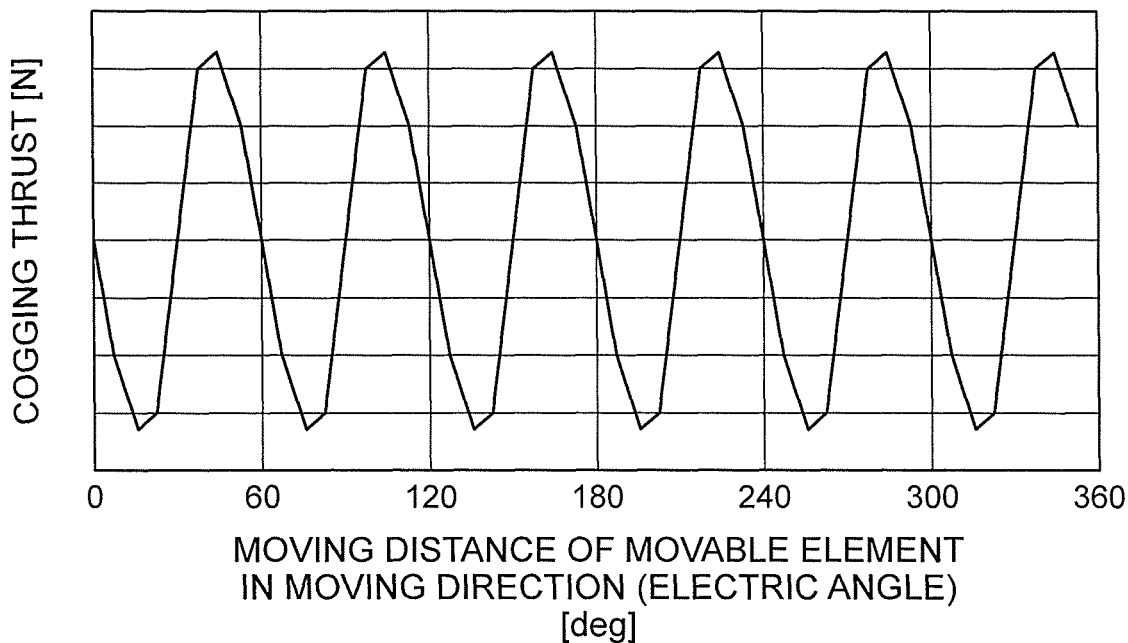
FIG. 7 is a diagram for illustrating a cogging thrust waveform generated in a synchronous linear motor in a second comparative example with respect to the synchronous linear motor according to the first embodiment of this invention.

FIG. 7 is a diagram for illustrating a cogging thrust waveform generated in a synchronous linear motor in a second comparative example with respect to the synchronous linear motor according to the first embodiment. The horizontal axis in FIG. 7 represents a moving distance of the movable element 2 along the moving direction A by an electric angle. The vertical axis in FIG. 7 represents a cogging thrust [N].

The second comparative example 202 of the synchronous linear motor is assumed to be a synchronous linear motor having the following configuration. That is, in the first comparative example 201 of the synchronous linear motor, the movable element 2 and the stator 3 each do not have ends on both end sides in the moving direction A being cut parts, and the movable element 2 and the stator 3 continue endlessly. In FIG. 7, there is shown a result of the electromagnetic field analysis for the cogging thrust in the second comparative example 202 of the synchronous linear motor.

Figure 8:
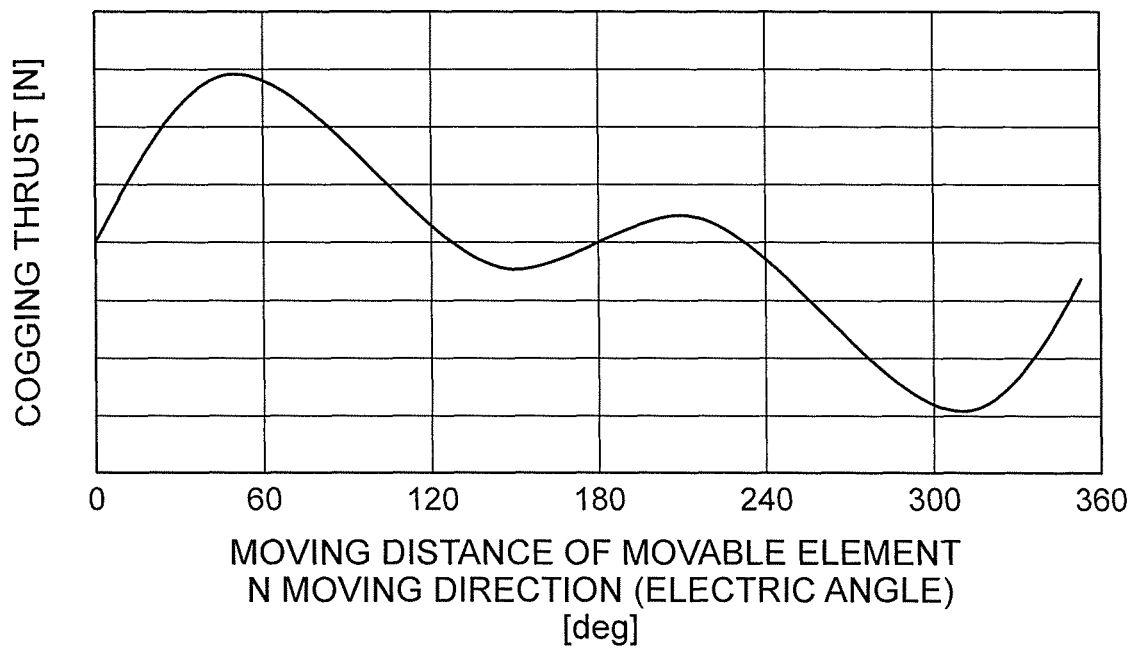
FIG. 8 is a diagram for illustrating a cogging thrust waveform generated in the first comparative example with respect to the synchronous linear motor according to the first embodiment of this invention.

FIG. 8 is a diagram for illustrating a cogging thrust waveform generated in the first comparative example with respect to the synchronous linear motor according to the first embodiment. The horizontal axis in FIG. 8 represents a moving distance of the movable element 2 along the moving direction A by an electric angle. The vertical axis in FIG. 8 represents a cogging thrust [N].

In the first comparative example 201 of the synchronous linear motor, the shape and the magnetic characteristic of all of the permanent magnets 5 arranged in the segment cores 4 are the same. Further, the width of the movable element 2 in the moving direction A is limited. That is, the movable element 2 has both ends in the moving direction A. In FIG. 8, there is shown a result of the electromagnetic field analysis for the cogging thrust in the first comparative example 201 of the synchronous linear motor.

Figure 9:
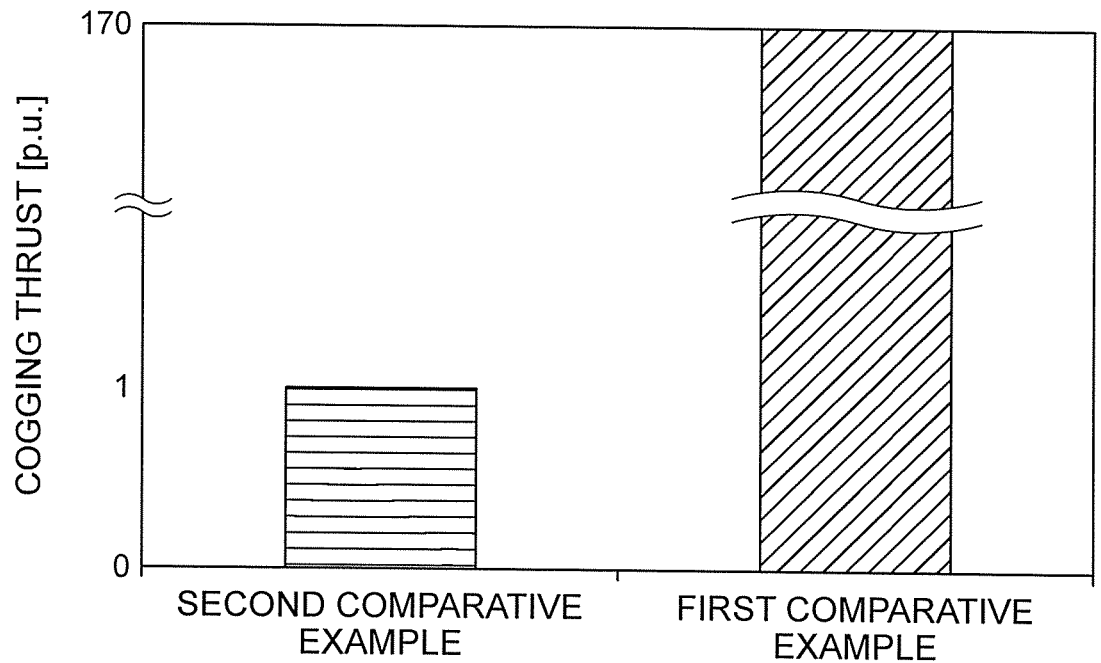
FIG. 9 is a comparison graph for showing respective cogging thrusts in the first comparative example and the second comparative example with respect to the synchronous linear motor according to the first embodiment of this invention.

FIG. 9 is a comparison graph for showing respective cogging thrusts in the first comparative example and the second comparative example with respect to the synchronous linear motor according to the first embodiment. The left side in FIG. 9 shows a case of the second comparative example 202 in which the movable element 2 has no ends, and the right side shows a case of the first comparative example 201 in which the movable element 2 has both ends. The vertical axis in FIG. 9 represents a value [p.u.] of a difference (pp: Peak-to-Peak) between a maximum value and a minimum value of an amplitude of the cogging thrust, which is normalized by setting a value pp of the cogging thrust in the second comparative example 202 in which the movable element 2 has no ends as 1. In FIG. 9, a value pp of the cogging thrust waveform in the second comparative example 202 in which the movable element 2 has no ends corresponds to a value pp of the cogging thrust waveform of FIG. 7, and a value pp of the cogging thrust waveform in the first comparative example 201 in which the movable element 2 has both ends corresponds to a value pp of the cogging thrust waveform in FIG. 8.

From FIG. 9, it can be understood that, in the first comparative example 201 in which the movable element 2 has ends on both end sides in the moving direction A, the cogging thrust is increased. This is because, as illustrated in FIG. 8, a primary cogging thrust having a frequency equal to a drive frequency is generated with respect to one cycle of the electric angle corresponding to 360°.

Figure 10:
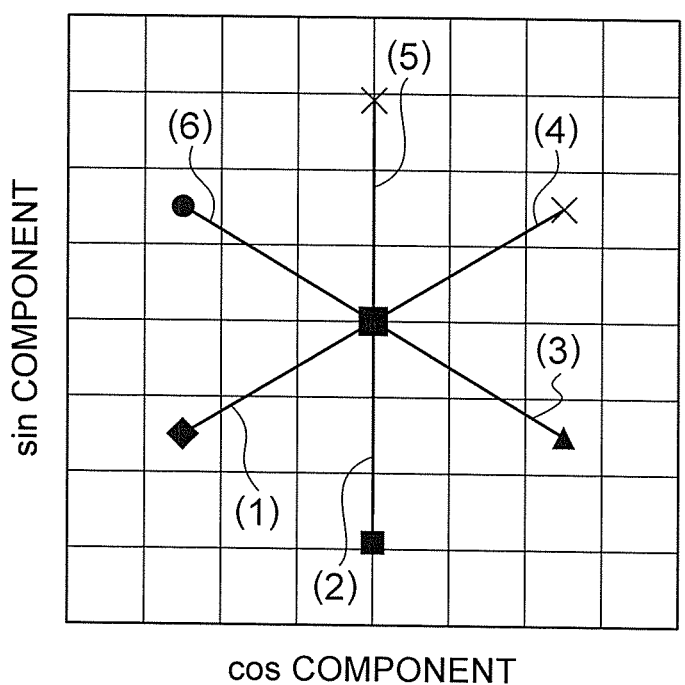
FIG. 10 is a phasor diagram for illustrating primary cogging thrust vectors generated in segment cores of the second comparative example with respect to the synchronous linear motor according to the first embodiment of this invention.

FIG. 10 is a phasor diagram for illustrating primary cogging thrust vectors generated in segment cores in the second comparative example with respect to the synchronous linear motor according to the first embodiment. The horizontal axis in FIG. 10 represents a cos component of the primary cogging thrust vectors, and the vertical axis in FIG. 10 represents a sin component of the primary cogging thrust vectors.

FIG. 10 is a phasor diagram for illustrating the primary cogging thrust vectors generated in the segment cores of the movable element 2 in the second comparative example 202 in which the movable element 2 continues endlessly and has no ends. The vectors (1) to (6) in FIG. 10 represent primary cogging thrust vectors generated in the segment cores 4 corresponding to the segment cores (1) to (6) in the order from the left side in the moving direction A illustrated in FIG. 2.

As illustrated in FIG. 10, the primary cogging thrust vectors generated in the segment cores 4 in the second comparative example 202 are distributed to respective quadrants at equal intervals of 60°. Therefore, in the synchronous linear motor having no ends as in the second comparative example 202, the primary cogging thrust vectors generated in the segment cores 4 cancel out one another, with the result that the primary cogging thrust is not generated.

Figure 11:
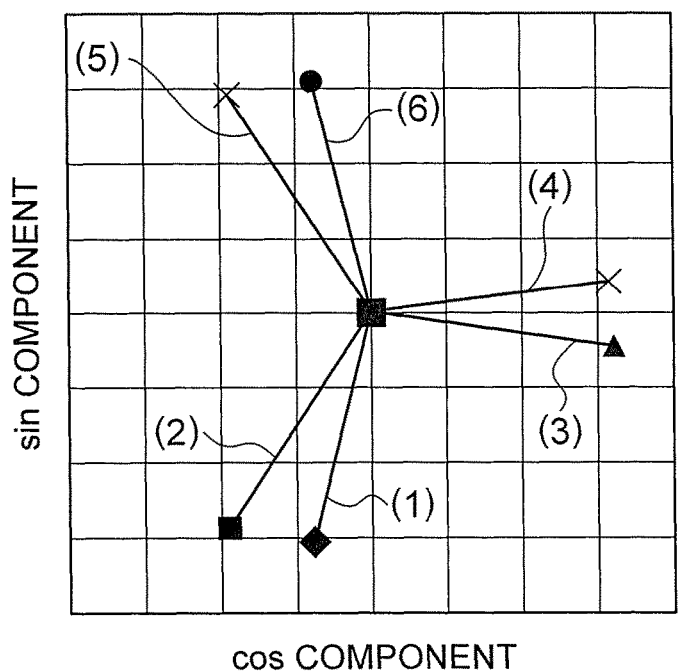
FIG. 11 is a phasor diagram for illustrating primary cogging thrust vectors generated in segment cores of the first comparative example with respect to the synchronous linear motor according to the first embodiment of this invention.

FIG. 11 is a phasor diagram for illustrating primary cogging thrust vectors generated in segment cores in the first comparative example with respect to the synchronous linear motor according to the first embodiment. The horizontal axis in FIG. 11 represents a cos component of the primary cogging thrust vectors, and the vertical axis in FIG. 11 represents a sin component of the primary cogging thrust vectors.

In FIG. 11, unlike FIG. 10, the primary cogging thrust vectors are not arranged at equal intervals, and it can be understood that the primary cogging thrust vectors are not cancelled out one another.

From FIG. 10 and FIG. 11, the inventors of the present invention conducted analysis of the reason why the primary cogging thrust vectors are not arranged at equal intervals. As a result, the inventors of the present invention have found that the magnetic flux densities generated on the gap surfaces between the segment cores 4 and the stator 3 opposed thereto vary.

Figure 12:
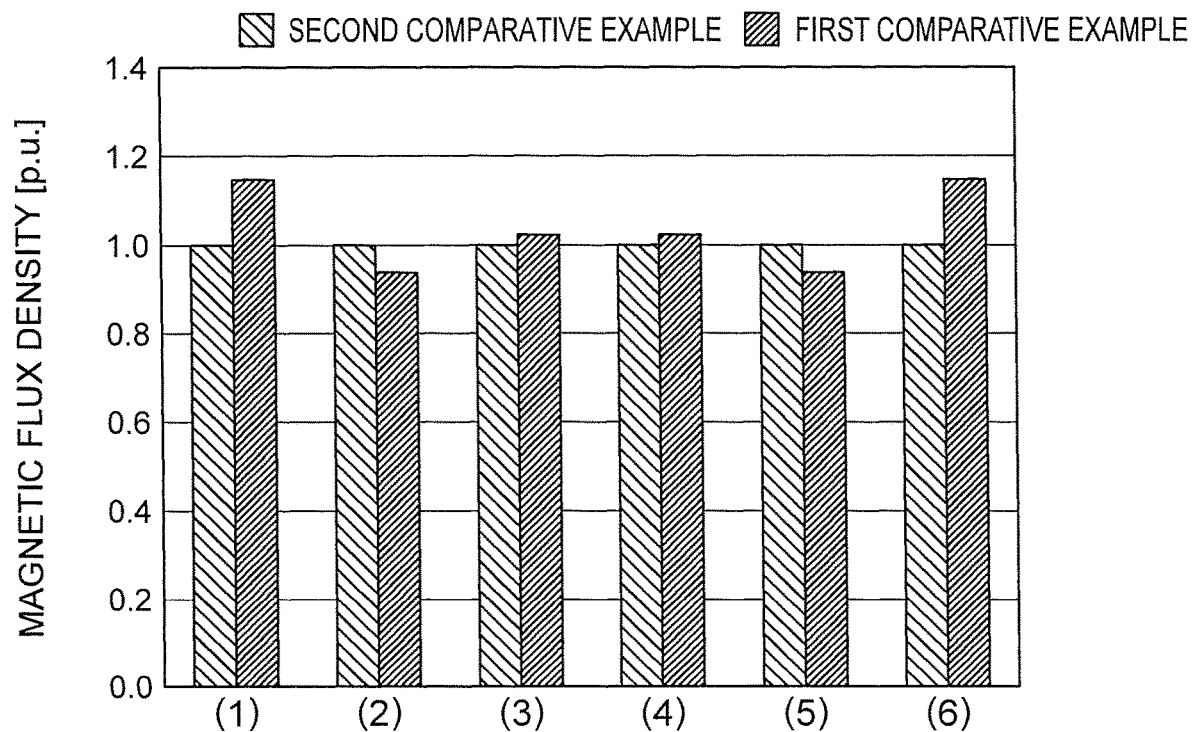
FIG. 12 is a comparison graph for showing magnetic flux densities generated on gap surfaces of the segment cores in the first comparative example and the second comparative example with respect to the synchronous linear motor according to the first embodiment of this invention.

FIG. 12 is a comparison graph for showing magnetic flux densities generated on the gap surfaces of the segment cores in the first comparative example and the second comparative example with respect to the synchronous linear motor according to the first embodiment. The horizontal axis in FIG. 12 represents the segment cores 4 corresponding to the segment cores (1) to (6) in the order from the left side in the moving direction A illustrated in FIG. 2. The vertical axis in FIG. 12 represents values [p.u.] of the magnetic flux densities generated on the gap surfaces of the segment cores 4, which are normalized by setting values of the magnetic flux densities generated on the gap surfaces of the segment cores 4 in the second comparative example 202 in which the movable element 2 has no ends as 1. In FIG. 12, the second comparative example 202 in which the movable element 2 has no ends and the first comparative example 201 in which the movable element 2 has both ends are shown together.

In FIG. 12, in the second comparative example 202 in which the movable element 2 has no ends, the magnetic flux densities generated on the gap surfaces between the segment cores 4 and the stator 3 opposed thereto are equal. Meanwhile, in the first comparative example 201 in which the movable element 2 has both ends, values of the magnetic flux densities generated on the gap surfaces between the segment cores 4 and the stator 3 opposed thereto vary.

From the facts described above, it is found that, when the movable element 2 has both ends, the magnetic flux densities generated on the gap surfaces between the segment cores 4 and the stator 3 opposed thereto vary. Therefore, it is found that, as illustrated in FIG. 11, the phases of the primary cogging thrust vectors change.

Therefore, the inventors of the present invention have found that the primary cogging thrust can be reduced by adjusting phases of the primary cogging thrust vectors through changes in magnetic flux densities generated on the gap surfaces between the segment cores 4 and the stator 3 opposed thereto.

Figure 13:
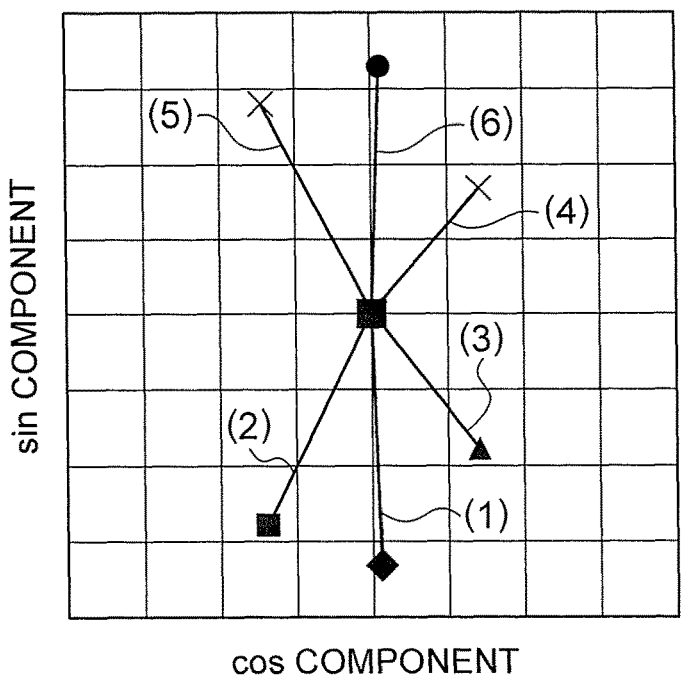
FIG. 13 is a phasor diagram for illustrating primary cogging thrust vectors generated in the segment cores of the synchronous linear motor according to the first embodiment of this invention.

FIG. 13 is a phasor diagram for illustrating primary cogging thrust vectors generated in segment cores with respect to the synchronous linear motor according to the first embodiment. The horizontal axis in FIG. 13 represents a cos component of the primary cogging thrust vectors, and the vertical axis in FIG. 13 represents a sin component of the primary cogging thrust vectors.

In order to change the phases of the primary cogging thrust vectors generated in the segment cores 4 through changes in values of the magnetic flux densities generated on the gap surfaces between the segment cores 4 and the stator 3 opposed thereto, the inventors of the present invention changed the thickness hm1 of each of the permanent magnets 5 arranged in the segment cores 4 on both end sides in the moving direction A and the thickness hm2 of each of the permanent magnets 5 arranged in the segment cores 4 located second from the both end sides in the moving direction A so as to satisfy the relationship of hm1<hm2, and determined the cogging thrust by the electromagnetic field analysis. As a result, the phasor diagram of the primary cogging thrust is changed to FIG. 13 with respect to FIG. 11 being the phasor diagram of the primary cogging thrust in the first comparative example 201. Therefore, the primary cogging thrust vectors generated in the segment cores (1) to (6) being the segment cores 4 are arranged so as to suppress one another.

Figure 14:
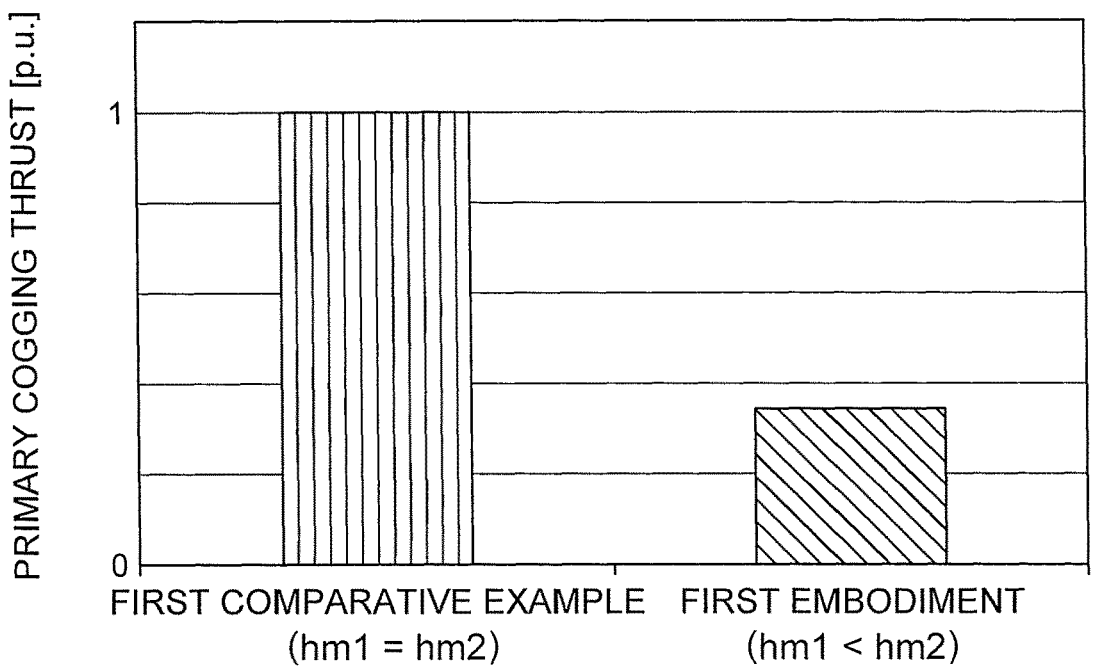
FIG. 14 is a comparison graph for showing respective primary cogging thrusts in the synchronous linear motor according to the first embodiment of this invention and the first comparative example.

FIG. 14 is a comparison graph for showing the primary cogging thrusts in the synchronous linear motor according to the first embodiment and the first comparative example. The horizontal axis in FIG. 14 represents the first comparative example 201 in which the movable element 2 has both ends and the synchronous linear motor 101 according to the first embodiment. The vertical axis in FIG. 14 represents a value [p.u.] of an amplitude of the primary cogging thrust, which is normalized by setting a value of the amplitude of the primary cogging thrust in the first comparative example 201 as 1. In FIG. 14, the first comparative example 201 corresponds to the case in which the relationship of hm1=hm2 is satisfied, and the synchronous linear motor 101 according to the first embodiment corresponds to the case in which the synchronous linear motor 101 according to the first embodiment satisfies the relationship of hm1<hm2.

As shown in FIG. 14, in the synchronous linear motor 101 according to the first embodiment, the primary cogging thrust is reduced to 40% or less with respect to the primary cogging thrust in the first comparative example 201.

Figure 15:
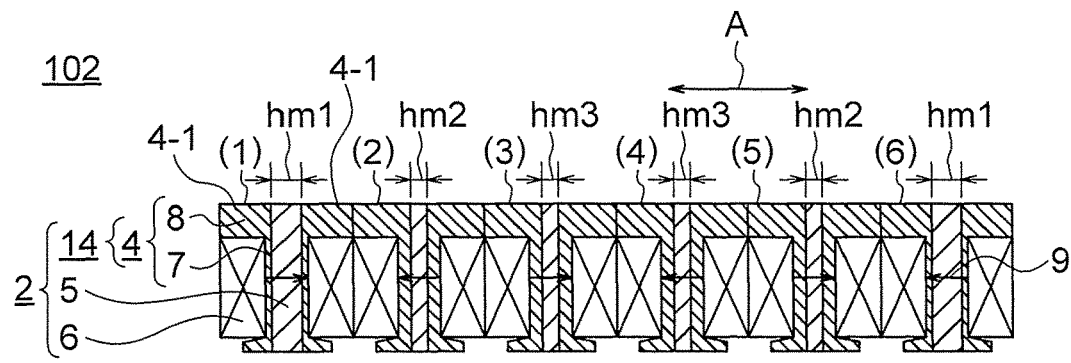
FIG. 15 is a sectional view for illustrating a movable element in a first modification example of the synchronous linear motor according to the first embodiment of this invention, which is taken along the direction perpendicular to the stacking direction of the electromagnetic steel plates.

FIG. 15 is a sectional view for illustrating a movable element in a first modification example of the synchronous linear motor according to the first embodiment, which is taken along the direction perpendicular to the stacking direction of the electromagnetic steel plates. In FIG. 15, a first modification example 102 of the synchronous linear motor is different from the synchronous linear motor 101 according to the first embodiment in the following points. In the first modification example 102 of the synchronous linear motor, the thickness hm1 of each of the permanent magnets 5 arranged in the segment cores 4 located on both end sides in the moving direction A is larger than the thickness hm2 of each of the permanent magnets 5 arranged in the segment cores 4 located second from the both end sides in the moving direction A. That is, the relationship of hm1>hm2 is satisfied.

As illustrated in FIG. 15, with the relationship of hm1>hm2 being satisfied, the phases of the vectors of the primary cogging thrust can be changed to the direction opposite to the direction of the phase change given in the case of changing from hm1=hm2 to hm1<hm2. Thus, values of the magnetic flux densities generated on the gap surfaces of the segment cores 4 can be changed.

Even with this configuration, for example, as illustrated in FIG. 13, the phases of the primary cogging thrust vectors can be changed to the arrangement in which the primary cogging thrust vectors generated in the segment cores (1) to (6) being the segment cores 4 suppress one another. Thus, as shown in FIG. 14, the primary cogging thrust can be reduced.

Moreover, for the same reason as that described above, for example, even when the relationships of hm1<hm3, hm1>hm3, hm2<hm3, hm2>hm3, or a combination of hm1<hm3 and hm2>hm3 is employed, the values of the magnetic flux densities generated on the gap surfaces of the segment cores 4 can be changed. That is, as long as the plurality of permanent magnets 5 have two or more different shapes, for example, as illustrated in FIG. 13, the phases of the primary cogging thrust vectors can be changed to the arrangement in which the primary cogging thrust vectors generated in the segment cores (1) to (6) being the segment cores 4 suppress one another. Thus, as shown in FIG. 14, the primary cogging thrust can be reduced.

Figure 16:
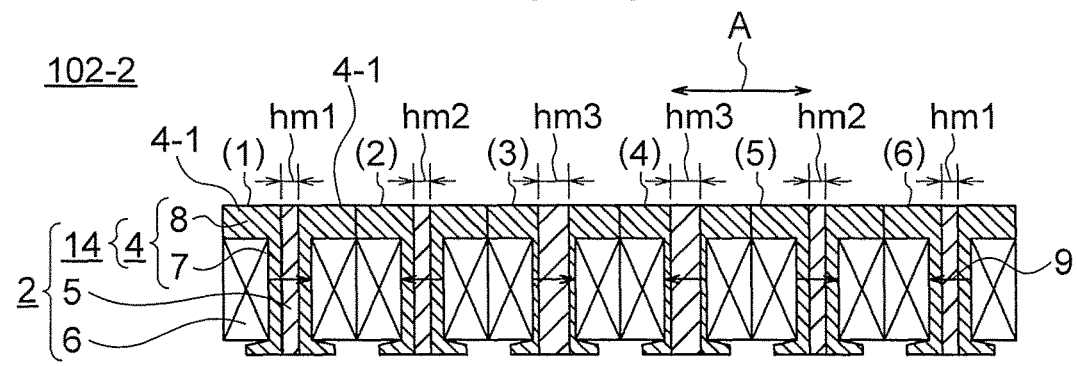
FIG. 16 is a sectional view for illustrating a movable element in a second modification example of the synchronous linear motor according to the first embodiment of this invention, which is taken along the direction perpendicular to the stacking direction of the electromagnetic steel plates.

FIG. 16 is a sectional view for illustrating a movable element in a second modification example of the synchronous linear motor according to the first embodiment, which is taken along the direction perpendicular to the stacking direction of the electromagnetic steel plates. In FIG. 16, a second modification example 102-2 of the synchronous linear motor is different from the synchronous linear motor 101 according to the first embodiment in the following points. In the second modification example 102-2 of the synchronous linear motor, the thickness hm1 of each of the permanent magnets 5 arranged in the segment cores 4 located on both end sides in the moving direction A, the thickness hm2 of each of the permanent magnets 5 arranged in the segment cores 5 located second from the both end sides in the moving direction A, and the thickness hm3 of each of the permanent magnets 5 arranged in the segment cores 4 located third from the both end sides in the moving direction A are different from one another. That is, the relationship of hm1≠hm2≠hm3 is satisfied.

Figure 17:
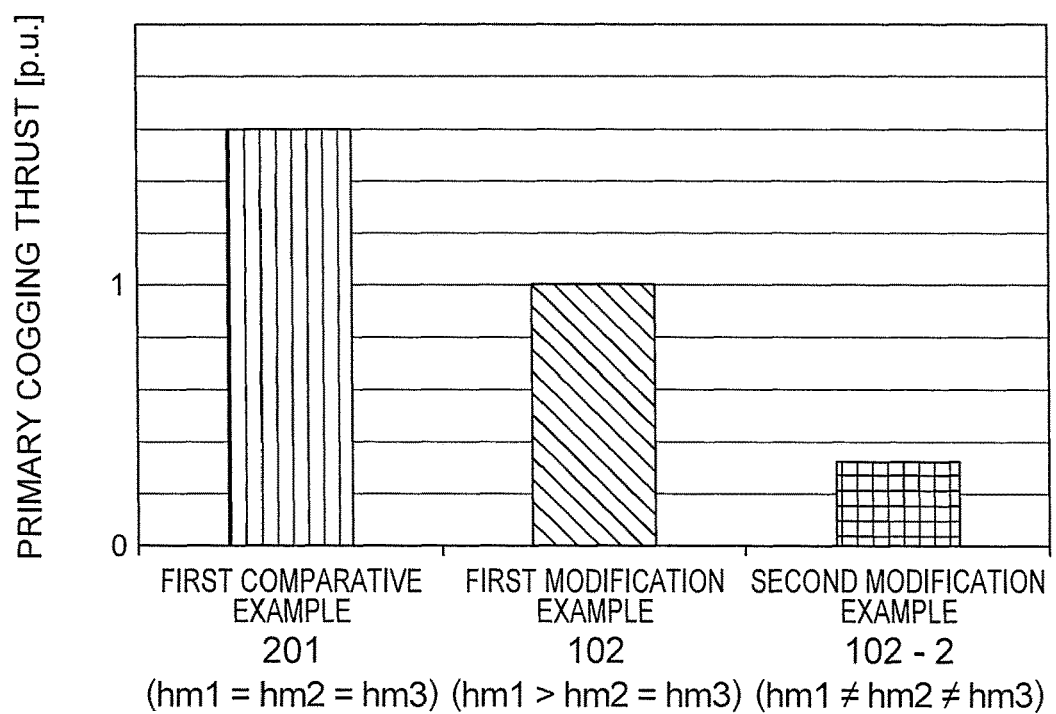
FIG. 17 is a comparison graph for showing primary cogging thrusts in the first comparative example with respect to the synchronous linear motor according to the first embodiment of this invention, the first modification example of this invention, and the second modification example of this invention.

FIG. 17 is a comparison graph for showing primary cogging thrusts in the first comparative example with respect to the synchronous linear motor according to the first embodiment, the first modification example of this invention, and the second modification example of this invention. The horizontal axis in FIG. 17 represents the first comparative example 201 in which the movable element 2 has both ends, the first modification example 102 of the synchronous linear motor according to the first embodiment, and the second modification example 102-2 of the synchronous linear motor according to the first embodiment. The vertical axis in FIG. 17 represents a value [p.u.] of an amplitude of the primary cogging thrust, which is normalized by setting a value of the amplitude of the primary cogging thrust in the first modification example 102 of the synchronous linear motor according to the first embodiment as 1.

As illustrated in FIG. 16, in the second modification example 102-2 of the synchronous linear motor, when the thicknesses hm1, hm2, and hm3 of the permanent magnets 5 are set so as to satisfy the relationship of hm1≠hm2≠hm3, as shown in FIG. 17, the primary cogging thrust can be reduced by about 70% as compared to the synchronous linear motor 101 according to the first embodiment illustrated in FIG. 2 satisfying the relationship of hm2>hm1=hm3 and the first modification example 102 illustrated in FIG. 15 satisfying the relationship of hm1>hm2=hm3.

In FIG. 16, the thicknesses hm1, hm2, and hm3 of the permanent magnets 5 satisfy the relationship of hm1<hm2<hm3. However, even when the relationship other than the combination mentioned above is employed, it is only required that the permanent magnets 5 have three or more different thicknesses.

Figure 18:
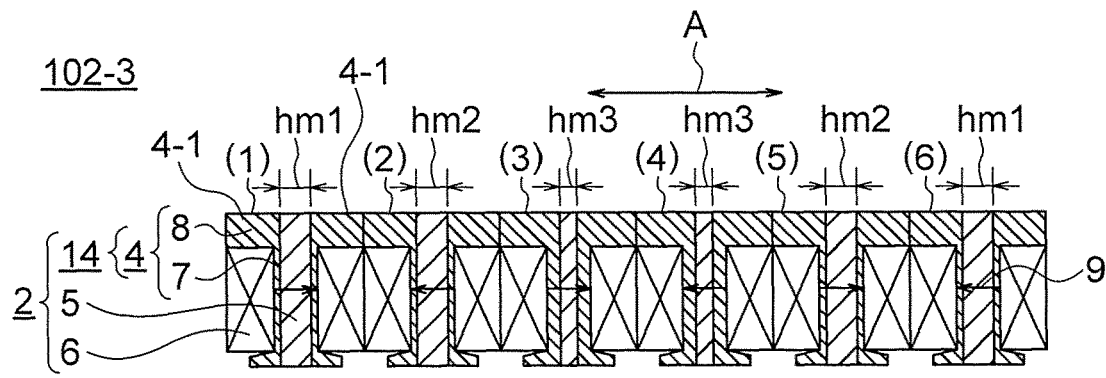
FIG. 18 is a sectional view for illustrating a movable element in a third modification example of the synchronous linear motor according to the first embodiment of this invention, which is taken along the direction perpendicular to the stacking direction of the electromagnetic steel plates.

FIG. 18 is a sectional view for illustrating a movable element in a third modification example of the synchronous linear motor according to the first embodiment, which is taken along the direction perpendicular to the stacking direction of the electromagnetic steel plates. In FIG. 18, a third modification example 102-3 of the synchronous linear motor is different from the synchronous linear motor 101 according to the first embodiment in the following points. In the third modification example 102-3 of the synchronous linear motor, the thickness hm1 of each of the permanent magnets 5 arranged in the segment cores 4 located on both end sides in the moving direction A and the thickness hm2 of each of the permanent magnets 5 arranged in the segment cores 4 located second from the both end sides in the moving direction A are equal. Moreover, the thickness hm3 of each of the permanent magnets 5 arranged in the segment cores 4 located third from the both end sides in the moving direction A is different from the thicknesses hm1 and hm2. That is, the relationship of hm1=hm2≠hm3 is satisfied.

Even with such a configuration of the third modification example 102-3 of the synchronous linear motor, the phases of the primary cogging thrust vectors can be changed to the arrangement in which the primary cogging thrust vectors generated in the segment cores (1) to (6) being the segment cores 4 suppress one another. Thus, the primary cogging thrust can be reduced.

Moreover, the thicknesses hm of the permanent magnets 5 in the moving direction A are changed, and hence the stroke of the movable element 2 can be finely adjusted.

Figure 19:
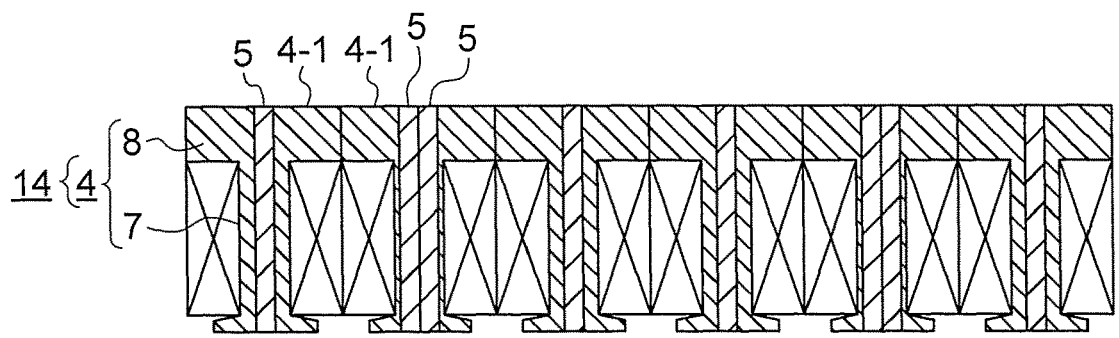
FIG. 19 is a sectional view for illustrating the movable element in the first modification example of the synchronous linear motor according to the first embodiment of this invention including permanent magnets divided in an advancing direction, which is taken along the direction perpendicular to the stacking direction.

In FIG. 2, FIG. 15, FIG. 16, and FIG. 18 in the first embodiment, the thicknesses hm1, hm2, and hm3 of the permanent magnets 5 each are indicated as an entire thickness of the permanent magnet 5 which is not divided. However, the thicknesses hm may each be a thickness of a stack of a plurality of permanent magnets 5 as illustrated in FIG. 19.

In the synchronous linear motors 101, 102, 102-2, and 102-3 according to the first embodiment, in order to reduce the primary cogging thrust by balancing the primary cogging thrust vectors, it is desired that, as illustrated in FIG. 13, the plurality of permanent magnets 5 having the same shape be arranged in the segment cores 4 at positions symmetrical with respect to the center of the width of the movable element 2 in the moving direction A.

However, even when the plurality of permanent magnets 5 having the same shape are not arranged in the segment cores 4 at positions symmetrical with respect to the center of the width of the movable element 2 in the moving direction A, as described above, the phases of the primary cogging thrust vectors can be changed to the arrangement in which the primary cogging thrust vectors suppress one another. Therefore, the primary cogging thrust can be reduced.

In the synchronous linear motors 101, 102, 102-2, and 102-3 according to the first embodiment, the number of the segment cores 4 and the number of the permanent magnets 5 are six, and the number of the projecting poles 11 of the stator 3 arranged opposed to the movable element 2 is five. That is, the width of the movable element 2 in the moving direction A, which is a width of the six segment cores 4 in the moving direction A, is equal to five times the interval in the moving direction A between one end surface of the projecting pole 11 in the moving direction A and one end surface of the adjacent projecting pole 11 in the moving direction A. As illustrated in FIG. 13, in order to reduce the primary cogging thrust by balancing the primary cogging thrust vectors, it is desired that the number of the plurality of projecting poles 11 opposed in the moving direction of the movable element 2 be an integer. That is, it is desired that the width of the movable element 2 in the moving direction A is integer multiples of the interval in the moving direction A between the one end surface of the projecting pole 11 in the moving direction A and the one end surface of the adjacent projecting pole 11 in the moving direction A.

However, even when the number of the segment cores 4, the number of the permanent magnets 5, and the number of the projecting poles 11 of the stator 3 arranged opposed to the movable element 2 are in a combination other than those described above, the phases of the primary cogging thrust vectors can be changed to the arrangement in which the primary cogging thrust vectors suppress one another. Therefore, the primary cogging thrust can be reduced. As combinations of the numbers other than those described above, for example, there is a case in which the number of the permanent magnets 5 is smaller than the number of the segment cores 5 such as a case in which the permanent magnets 5 are not arranged in the segment cores 4 located second from the both end sides in the moving direction A, or a case in which the number of the plurality of projecting poles 11 opposed to the movable element 2 is not an integer.

In the synchronous linear motor according to the first embodiment, the lengths of the permanent magnets 5 in the projecting direction of the teeth 7 may vary in place of the thicknesses hm of the permanent magnets 5 in the moving direction A. Even with this configuration, the phases of the primary cogging thrust vectors can be changed to the arrangement in which the primary cogging thrust vectors generated in the segment cores 4 suppress one another. Thus, the primary cogging thrust can be reduced.

However, when the lengths of the permanent magnets 5 in the projecting direction of the teeth 7 vary, the lengths of the permanent magnets 5 opposed to the teeth 7 vary depending on the segment cores 4 in the cross section including the moving direction A and the projecting direction of the teeth 7, which is a cross section of FIG. 2 along which the magnetic flux flows. Therefore, as the lengths of the permanent magnets 5 opposed to the teeth 7 are larger, the influence of the magnetic saturation by the magnetic fluxes of the permanent magnets 5 become larger, with the result that the magnetic fluxes of the permanent magnets 5 become more likely to flow to the gap surfaces on the stator 3 side on which the magnetic resistance is relatively small. Therefore, the inductance determined based on the magnetic fluxes interlinking on the coils 6 wound around the teeth 7 significantly influenced by the magnetic saturation becomes larger than the inductance of the coils 6 wound around the teeth 7 less affected by the magnetic saturation. Thus, the inductance of each phase used for the drive control of the synchronous linear motor is unbalanced, with the result that the thrust pulsation generated at the time of drive of the synchronous linear motor is increased, and the controllability is degraded.

Therefore, it is desired that the thicknesses hm of the permanent magnets 5 in the moving direction A vary. This is because the lengths of the permanent magnets 5 opposed to the teeth 7 are equal and do not vary depending on the segment cores 4 in the cross section including the moving direction A and the projecting direction of the teeth 7. With those configurations, in the synchronous linear motor according to the first embodiment, the unbalance in inductance of the coils 6 wound around the teeth 7 of the segment cores 4 can be suppressed. Therefore, the thrust pulsation given at the time of drive of the synchronous linear motor can be reduced, and the controllability is improved.

In particular, due to the influence of the ends, the inductance of the coils 6 wound around the teeth 7 of the segment cores (1) and (6) being the segment cores 4 on the both end sides in the moving direction A is liable to be smaller than the inductance of the coils 6 wound around the teeth 7 of the segment cores (2) to (5) being the segment cores 4 other than the segment cores 4 on the both end sides in the moving direction A, and the inductance of each phase is liable to be unbalanced.

In the synchronous linear motor according to the first embodiment, the lengths of the permanent magnets 5 opposed to the teeth 7 do not vary depending on the segment cores 4, thereby being capable of suppressing the unbalance even when the coils 6 are at least wound around the teeth 7 on the both end sides in the moving direction A.

Moreover, in the case in which the lengths of the permanent magnets 5 in the projecting direction of the teeth 7 vary, because the coils 6 are wound around all of the teeth 7 of the segment cores 4, when the lengths of the permanent magnets 5 opposed to the teeth 7 vary depending on the segment cores 4, the surface pressure applied to the permanent magnets 5 vary due to the winding and fastening force applied to the teeth at the time when the coils 6 are wound. Therefore, there is a fear in that the permanent magnets 5 are cracked depending on the surface pressure.

Therefore, it is desired that the thicknesses hm of the permanent magnets 5 in the moving direction A vary. With those configurations, in the synchronous linear motor according to the first embodiment, the permanent magnets 5 can be prevented from being cracked.

Second Embodiment

Figure 20:
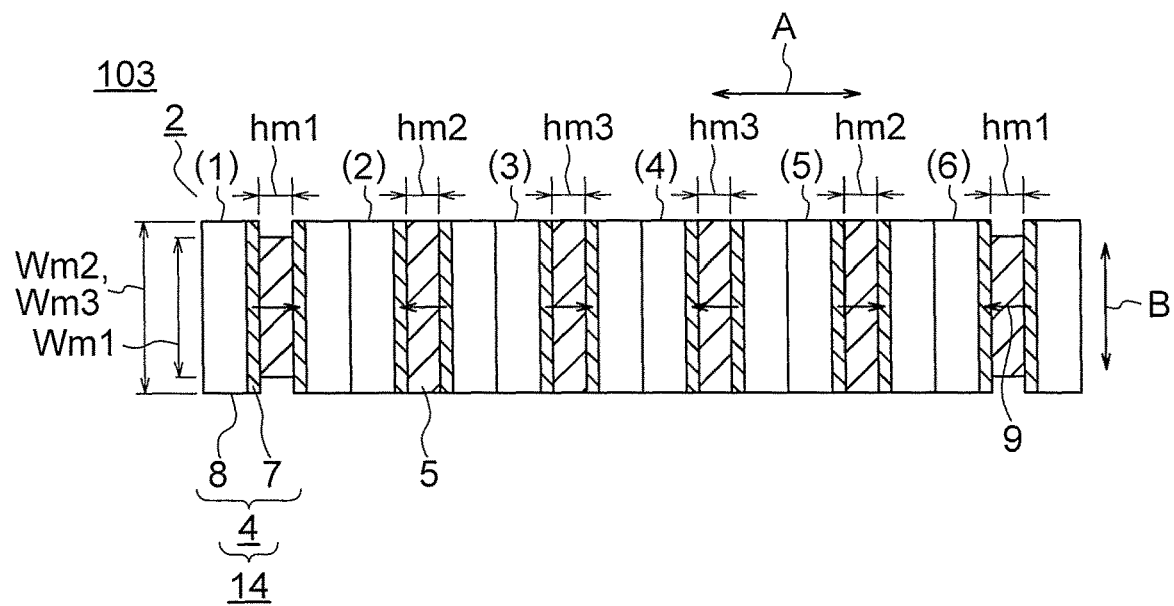
FIG. 20 is a sectional view for illustrating a movable element of a synchronous linear motor according to a second embodiment of this invention as seen from a stator side, which is taken along a direction parallel to the stacking direction of the electromagnetic steel plates and to a moving direction.
Figure 21:
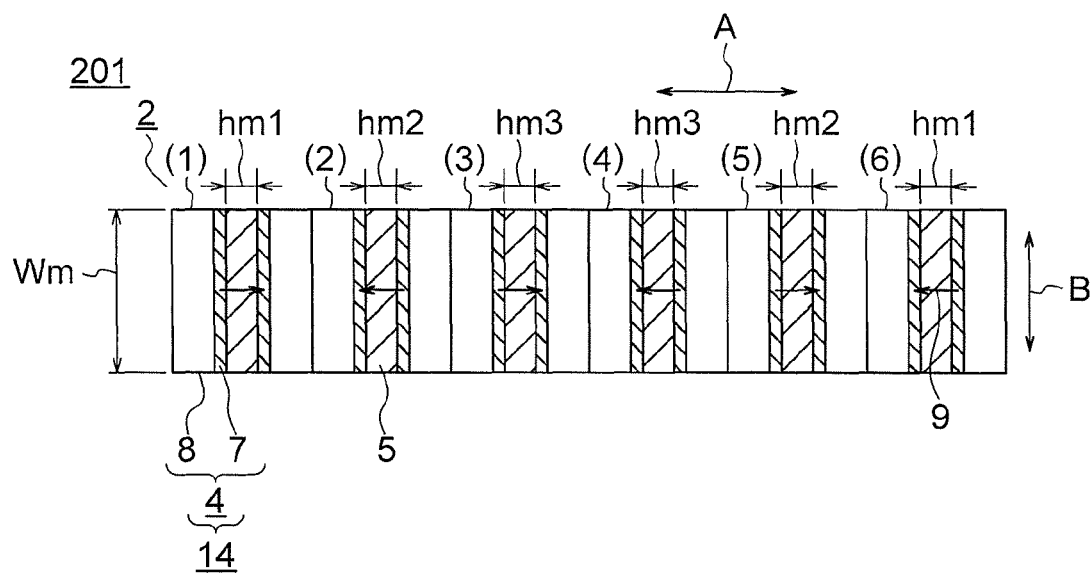
FIG. 21 is a sectional view for illustrating a movable element in a comparative example of the synchronous linear motor according to the second embodiment of this invention as seen from the stator side, which is taken along the direction parallel to the stacking direction of the electromagnetic steel plates and to the moving direction.
Figure 22:
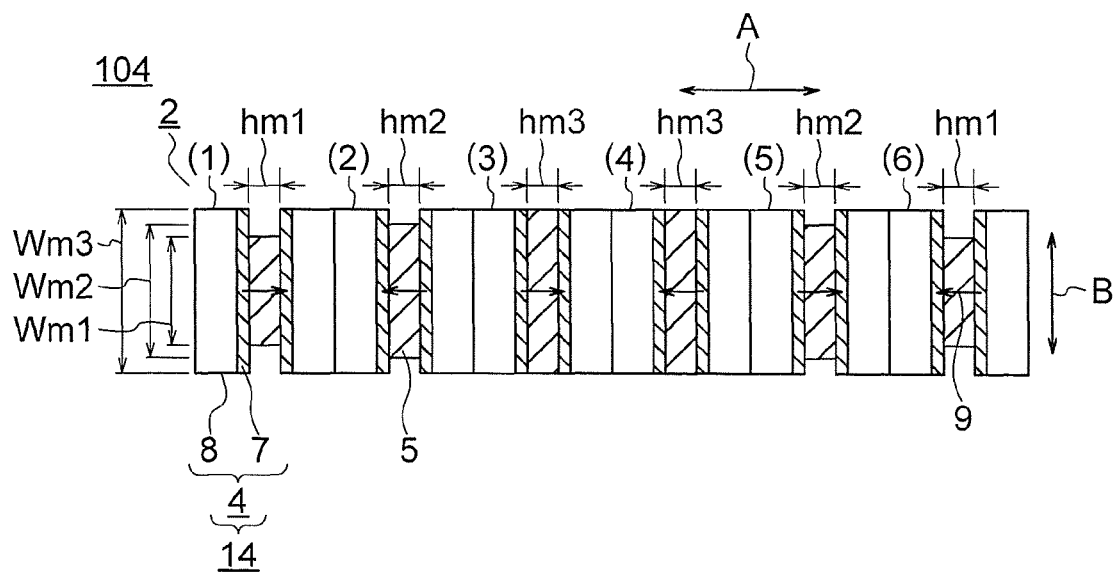
FIG. 22 is a sectional view for illustrating a movable element in a fourth modification example of the synchronous linear motor according to the second embodiment of this invention as seen from the stator side, which is taken along the direction parallel to the stacking direction of the electromagnetic steel plates and to the moving direction.

FIG. 20 is a sectional view for illustrating a movable element of a synchronous linear motor according to a second embodiment of this invention as seen from the stator side, which is taken along the direction parallel to the stacking direction of the electromagnetic steel plates and to the moving direction. More in detail, FIG. 20 as well as FIG. 21 and FIG. 22, which are described later, are transverse sectional views taken along the moving direction A at positions of the arrows of the magnetization direction 9 in FIG. 2, and this similarly applies in the following description. In FIG. 20 to FIG. 22, the coils 6 are not illustrated.

In FIG. 20, a synchronous linear motor 103 according to the second embodiment is different from the synchronous linear motor 101 according to the first embodiment in the following points.

When there are given a width Wm1 in the stacking direction B for each of the permanent magnets 5 arranged in the segment cores 4 located on both end sides in the moving direction A, a width Wm2 in the stacking direction B for each of the permanent magnets 5 arranged in the segment cores 4 located second from the both end sides in the moving direction A, and a width Wm3 in the stacking direction B for each of the permanent magnets 5 arranged in the segment cores 4 located third from the both end sides in the moving direction A, the relationship of Wm1≠Wm2 is satisfied. Moreover, the relationship of Wm2=Wm3 is satisfied. The number of different shapes of the plurality of permanent magnets 5, that is, the number of different kinds of shapes is two.

Moreover, the two permanent magnets 5 each having the width Wm1 are arranged in the teeth 7 of the segment cores (1) and (6) being the segment cores 4 located at positions symmetrical with respect to a center of a width of the movable element 2 in the moving direction A, respectively. Moreover, the two permanent magnets 5 each having the width Wm2 are arranged in the teeth 7 of the segment cores (2) and (5) being the segment cores 4 located at positions symmetrical with respect to the center of the width of the movable element 2 in the moving direction A, respectively. Moreover, the two permanent magnets 5 each having the width Wm3 are arranged in the teeth 7 of the segment cores (3) and (4) being the segment cores 4 located at positions symmetrical with respect to the center of the width of the movable element 2 in the moving direction A, respectively. That is, the plurality of permanent magnets 5 having the same shape are arranged in the teeth 7 of the segment cores 4 located at positions symmetrical with respect to the center of the width of the movable element 2 in the moving direction A.

FIG. 21 is a sectional view for illustrating a movable element in a comparative example with respect to the synchronous linear motor according to the second embodiment as seen from the stator side, which is taken along the direction parallel to the stacking direction of the electromagnetic steel plates and to the moving direction. In FIG. 21, the comparative example 201 of the synchronous linear motor is different from the synchronous linear motor 103 according to the second embodiment in the following points. The comparative example 201 of the synchronous linear motor in FIG. 21 has the same configuration as the first comparative example 201 of the synchronous linear motor in FIG. 6 of the first embodiment as seen from a different cross section. In the comparative example 201 in FIG. 21, the relationship of Wm=Wm1=Wm2=Wm3 is satisfied. In FIG. 21, the coils 6 are not illustrated.

Now, description is made of the effect of the second embodiment.

The thicknesses hm of all of the permanent magnets 5 in FIG. 20 and FIG. 21 in the moving direction A are equal. Moreover, in the case of the comparative example 201 of the synchronous linear motor illustrated in FIG. 21, the shape and the magnetic characteristic of all of the permanent magnets 5 are the same, and hence the primary cogging thrust increases as illustrated in FIG. 8 and FIG. 11 of the first embodiment.

Moreover, as described in the first embodiment, through changes in values of the magnetic flux densities generated on the gap surfaces of the segment cores 4, the phases of the primary cogging thrust vectors generated in the segment cores 4 can be changed.

The values of the magnetic flux densities generated on the gap surfaces of the segment cores 4 can be changed not only by changing the thicknesses hm of the permanent magnets 5 as described in the first embodiment with reference to FIG. 2 but also by changing the widths Wm in the stacking direction B of the permanent magnets 5 as illustrated in FIG. 20.

Thus, with the relationship of Wm1≠Wm2 as illustrated in FIG. 20, the values of the magnetic flux densities generated on the gap surfaces of the segment cores 4 can be changed, and the phases of primary cogging thrust vectors generated in the segment cores 4 can be changed. With this, as illustrated in FIG. 13 of the first embodiment, the primary cogging thrusts generated in the segment cores 4 can suppress one another. Therefore, as shown in FIG. 14 of the first embodiment, the primary cogging thrust can be reduced.

Moreover, when it is required that the phases of the primary cogging thrust vectors be changed in opposite directions, with the relationship of Wm1>Wm2, the phases of the primary cogging thrust vectors can be changed in the directions opposite to those in the case with the relationship of Wm1<Wm2. Therefore, similarly to FIG. 14 of the first embodiment, the primary cogging thrust vectors suppress one another, thereby being capable of reducing the primary cogging thrust.

Moreover, based on the same reasons as those described above, the values of the magnetic flux densities generated on the gap surfaces of the segment cores 4 can be changed with the relationships of Wm1<Wm3, Wm1>Wm3, Wm2<Wm3, Wm2>Wm3, or combinations of, for example, Wm1<Wm3 and Wm2>Wm3. Moreover, the combination of Wm1=Wm2≠Wm3 has a similar effect. That is, when the number of different shapes of the plurality of permanent magnets 5 is two or more, for example, as illustrated in FIG. 13 of the first embodiment, the phases of the primary cogging thrust vectors can be changed to the arrangement in which the primary cogging thrust vectors generated in the segment cores (1) to (6) being the segment cores 4 suppress one another.

Thus, as shown in FIG. 14 of the first embodiment, the primary cogging thrust can be reduced.

FIG. 22 is a sectional view for illustrating a movable element in a fourth modification example with respect to the synchronous linear motor according to the second embodiment as seen from the stator side, which is taken along the direction parallel to the stacking direction of the electromagnetic steel plates and to the moving direction. In FIG. 22, the fourth modification example 104 of the synchronous linear motor is different from the synchronous linear motor 103 according to the second embodiment in the following points. With regard to the fourth modification example 104 of the synchronous linear motor in FIG. 22, in the synchronous linear motor 103 according to the second embodiment, the width Wm1 in the stacking direction B of each of the permanent magnets 5 arranged in the segment cores 4 located on both end sides in the moving direction A, the width Wm2 in the stacking direction B of each of the permanent magnets 5 arranged in the segment cores 4 located second from the both end sides in the moving direction A, and the width Wm3 in the stacking direction B of each of the permanent magnets 5 arranged in the segment cores 4 located third from the both end sides in the moving direction A are different from one another. That is, the relationship of Wm1≠Wm2≠Wm3 is satisfied. In FIG. 22, the coils 6 are not illustrated.

As illustrated in FIG. 22, in the fourth modification example 104 of the synchronous linear motor, the widths Wm1, Wm2, and Wm3 in the stacking direction B of the permanent magnets 5 are set so as to satisfy the relationship of Wm1≠Wm2≠Wm3, thereby having variation in widths of three or more permanent magnets 5 in the stacking direction B. Thus, the phases of the primary cogging thrust vectors can be changed to the arrangement in which the primary cogging thrust vectors generated in the segment cores (1) to (6) being the segment cores 4 suppress one another.

In FIG. 22, the relationship of Wm1<Wm2<Wm3 is given. However, any other relationships may be applied as long as three or more different widths of the permanent magnets 5 in the stacking direction B are given.

Moreover, the widths Wm of the permanent magnets 5 in the stacking direction B are changed, and hence the cogging thrust can be changed without changing the stroke of the movable element 2.

Figure 23:
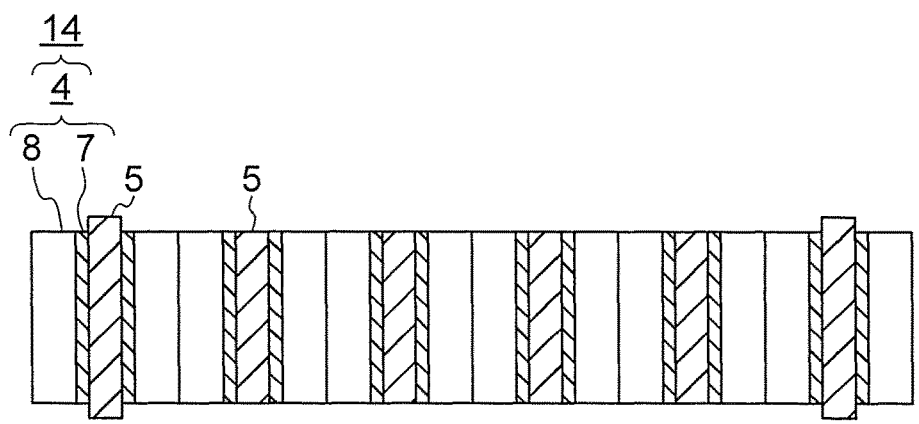
FIG. 23 is a sectional view for illustrating an example case in which the permanent magnets illustrated in FIG. 20 in the synchronous linear motor according to the second embodiment of this invention are longer than the electromagnetic steel plates.
Figure 24:
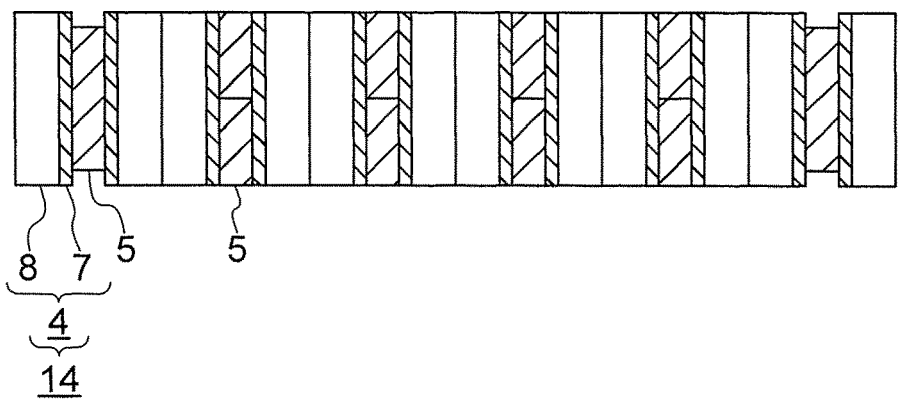
FIG. 24 is a sectional view for illustrating an example case in which the permanent magnets illustrated in FIG. 20 in the synchronous linear motor according to the second embodiment of this invention are divided in the stacking direction.
Figure 25:
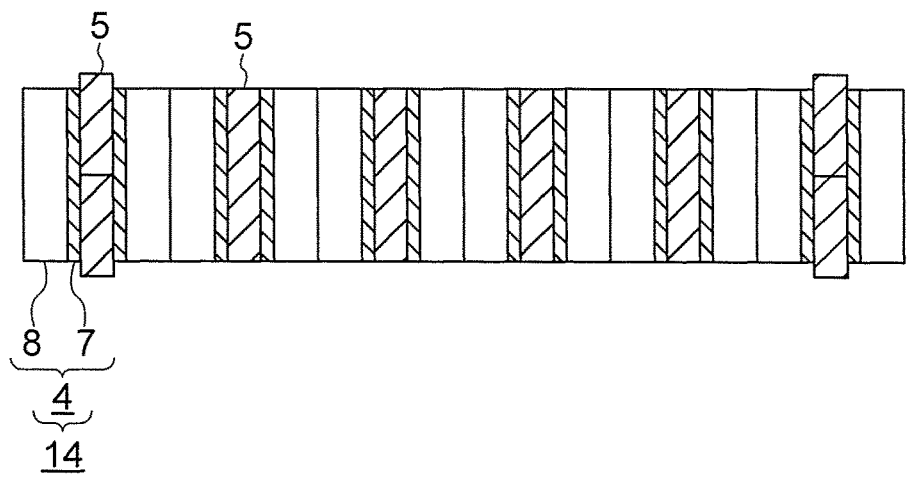
FIG. 25 is a sectional view for illustrating another example case in which the permanent magnets illustrated in FIG. 20 in the synchronous linear motor according to the second embodiment of this invention are divided in the stacking direction.

In FIG. 20, the widths of the permanent magnets 5 in the stacking direction B are illustrated so as to be shorter than the width of the segment cores 4 in the stacking direction B. However, as illustrated in FIG. 23, the width of the permanent magnets 5 in the stacking direction B may be longer than the width of the segment cores 4 in the stacking direction B. Moreover, as illustrated in FIG. 24 and FIG. 25, the permanent magnets 5 may each be divided into a plurality of segments in the stacking direction B.

Figure 26:
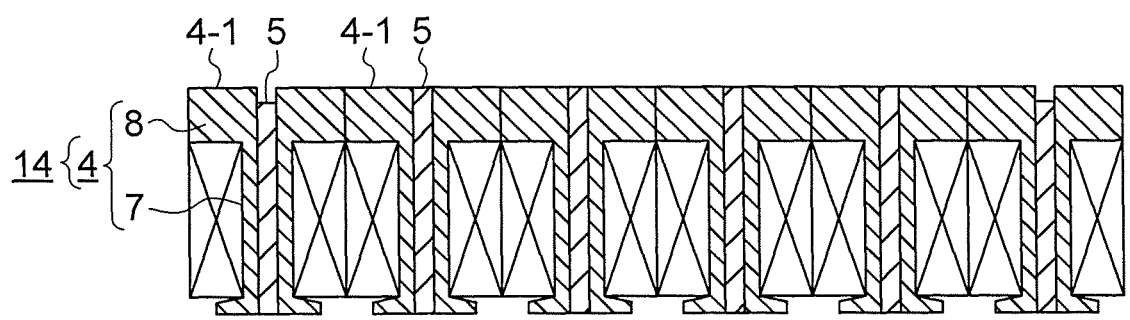
FIG. 26 is a sectional view for illustrating an example of a synchronous linear motor with respect to the first and second embodiments of this invention in which lengths of the permanent magnets in a projecting direction vary, which is taken along the direction perpendicular to the stacking direction.
Figure 27:
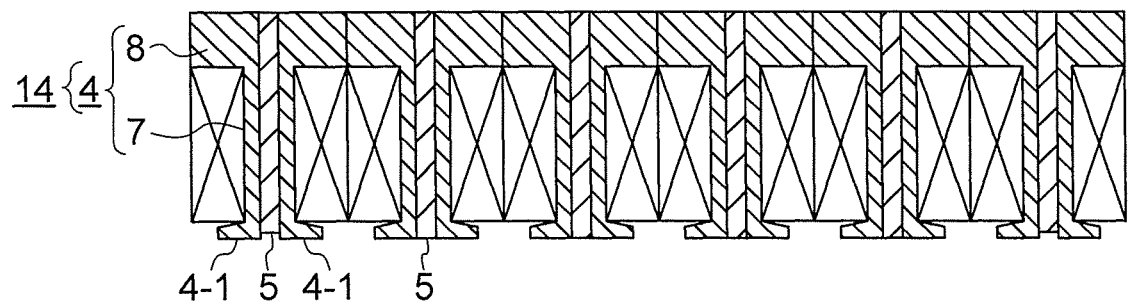
FIG. 27 is a sectional view for illustrating another example of a synchronous linear motor with respect to the first and second embodiments of this invention in which lengths of the permanent magnets in the projecting direction vary, which is taken along the direction perpendicular to the stacking direction.

In the synchronous linear motor according to the second embodiment, as illustrated in FIG. 26 and FIG. 27, the lengths of the permanent magnets 5 in the projecting direction of the teeth 7 may vary in place of the widths Wm of the permanent magnets 5 in the stacking direction B. Even with this configuration, the phases of the primary cogging thrust vectors can be changed to the arrangement in which the primary cogging thrust vectors generated in the segment cores 4 suppress one another, thereby being capable of reducing the primary cogging thrust.

However, when the lengths of the permanent magnets 5 in the projecting direction of the teeth 7 vary, as described in the first embodiment, the inductance of each phase to be used for drive control of the synchronous linear motor is unbalanced, and the thrust pulsation at the time of drive of the synchronous linear motor is increased, with the result that the controllability is degraded.

Therefore, it is desired that the widths Wm of the permanent magnets 5 in the stacking direction B vary. This is because the lengths of the permanent magnets 5 opposed to the teeth 7 are equal and do not vary depending on the segment cores 4 in the cross section including the moving direction A and the projecting direction of the teeth 7. With those configurations, in the synchronous linear motor according to the second embodiment, similarly to the first embodiment, even when the coils 6 are at least wound around the teeth 7 on the both end sides in the moving direction A, the unbalance in inductance of the coils 6 wound around the teeth 7 of the segment cores 4 can be suppressed. Therefore, the thrust pulsation given at the time of drive of the synchronous linear motor can be reduced, and the controllability is improved.

Third Embodiment

A synchronous linear motor according to a third embodiment of this invention is different from the synchronous linear motor 101 of FIG. 2 according to the first embodiment in the following points.

The synchronous linear motor according to the third embodiment has the same shape in appearance as the first comparative example 201 in FIG. 6 with respect to the synchronous linear motor according to the first embodiment, but is a synchronous linear motor which is different only in residual magnetic flux densities being magnetic characteristics of the permanent magnets 5 in the structure of the first comparative example 201. Specifically, when there are given a residual magnetic flux density Br1 for each of the permanent magnets 5 arranged in the segment cores 4 located on the both end sides in the moving direction A, a residual magnetic flux density Br2 for each of the permanent magnets 5 arranged in the segment cores 4 located second from the both end sides in the moving direction A, and a residual magnetic flux density Br3 for each of the permanent magnets 5 arranged in the segment cores 4 located third from the both end sides in the moving direction A, the relationship of Br1≠Br2 is satisfied. Moreover, the relationship of Br2=Br3 is satisfied. That is, the number of different magnetic characteristics in the plurality of permanent magnets 5 is two.

Moreover, the two permanent magnets 5 each having the residual magnetic flux density Br1 are arranged in the teeth 7 of the segment cores (1) and (6) being the segment cores 4 located at positions symmetrical with respect to the center of the width of the movable element 2 in the moving direction A, respectively. Moreover, the two permanent magnets 5 each having the residual magnetic flux density Br2 are arranged in the teeth 7 of the segment cores (2) and (5) being the segment cores 4 located at positions symmetrical with respect to the center of the width of the movable element 2 in the moving direction A, respectively. Moreover, the two permanent magnets 5 each having the residual magnetic flux density Br3 are arranged in the teeth 7 of the segment cores (3) and (4) being the segment cores 4 located at positions symmetrical with respect to the center of the width of the movable element 2 in the moving direction A, respectively. That is, the plurality of permanent magnets 5 having the same magnetic characteristic are arranged in the teeth 7 of the segment cores 4 located at positions symmetrical with respect to the center of the width of the movable element 2 in the moving direction A.

Moreover, all of the permanent magnets 5 of the synchronous linear motor according to the third embodiment have the same shape.

Now, description is made of the effect of the third embodiment.

As described in the first embodiment, through changes in values of the magnetic flux densities generated on the gap surfaces of the segment cores 4, the phases of the primary cogging thrust vectors generated in the segment cores 4 can be changed.

The values of the magnetic flux densities generated on the gap surfaces of the segment cores 4 can be changed not only by changing the thicknesses hm of the permanent magnets 5 described in the first embodiment with reference to FIG. 2 and the widths Wm of the permanent magnets 5 described in the second embodiment with reference to FIG. 20 but also by changing the residual magnetic flux densities Br of the permanent magnets 5 illustrated in FIG. 2 of the first embodiment.

Thus, with the relationship of Br1≠Br2, the values of the magnetic flux densities generated on the gap surfaces of the segment cores 4 can be changed, and the phases of the primary cogging thrust vectors generated in the segment cores 4 can be changed. With this, as illustrated in FIG. 13 of the first embodiment, the primary cogging thrusts generated in the segment cores 4 can suppress one another. Therefore, as shown in FIG. 14 of the first embodiment, the primary cogging thrust can be reduced.

Moreover, when it is required that the phases of the primary cogging thrust vectors be changed in opposite directions, with the relationship of Br1<Br2, the phases of the primary cogging thrust vectors can be changed in the directions opposite to those in the case with the relationship of Br1>Br2. Therefore, similarly to FIG. 14 of the first embodiment, the primary cogging thrust vectors suppress one another, thereby being capable of reducing the primary cogging thrust.

Moreover, the values of the magnetic flux densities generated on the gap surfaces of the segment cores 4 can be changed with the relationships of Br1<Br3, Br1>Br3, Br2<Br3, Br2>Br3, or combinations of, for example, Br1<Br3 and Br2>Br3. Moreover, the combination of Br1=Br2≠Br3 has a similar effect. That is, when the number of different magnetic characteristics of the plurality of permanent magnets 5 is two or more, for example, as illustrated in FIG. 13 of the first embodiment, the phases of the primary cogging thrust vectors can be changed to the arrangement in which the primary cogging thrust vectors generated in the segment cores (1) to (6) being the segment cores 4 suppress one another. Thus, as shown in FIG. 14 of the first embodiment, the primary cogging thrust can be reduced.

Further, also through three or more variations in magnetic characteristics of the permanent magnets 5 with the relationship of Br1≠Br2≠Br3 (for example, Br1<Br2<Br3), the phases of the primary cogging thrust vectors can be changed to the arrangement in which the primary cogging thrust vectors generated in the segment cores (1) to (6) being the segment cores 4 suppress one another.

Moreover, the magnetic flux densities of the permanent magnets 5 are changed, and hence the cogging thrust can be changed without changing the stroke of the movable element 2.

Moreover, in order to change the residual magnetic flux densities Br of the permanent magnets 5, it is only required that the magnetic characteristics of the permanent magnets 5 vary through a change in material called "grade" of the permanent magnets 5, a change in manufacture lot of the permanent magnets 5, or a change in magnetization ratio of the permanent magnets 5, and a method therefor is not particularly limited.

The magnetization ratio of the permanent magnets 5 is represented by a value that is obtained by, when the permanent magnets 5 are magnetized by an external magnetic field in a magnetization step for magnetization, dividing magnetization that remains after removal of the external magnetic field by magnetization in the saturated state. Therefore, the magnetization of the permanent magnets 5 can be adjusted in the magnetization step, thereby being capable of suppressing increase in number of parts with only one kind of the permanent magnet.

The synchronous linear motor may be constructed through a combination of the case in which the number of different shapes of the plurality of permanent magnets 5 is two and the case in which the number of different magnetic characteristics of the plurality of permanent magnets 5 is two, which are described in the first to third embodiments.

That is, this invention is not limited to the embodiments described above, and encompasses all of possible combinations of those.

INDUSTRIAL APPLICABILITY

The synchronous linear motor according to this invention is applicable to synchronous linear motors in various fields.

REFERENCE SIGNS LIST 101, 102, 102-2, 102-3, 103, 104 synchronous linear motor, 2 movable element, 3 stator, 4 segment core, 4-1 half segment core, 5 permanent magnet, 6 coil, 7 tooth, 8 core back, 9 magnetization direction, 10 base portion, 11 projecting pole, 14 core, 201 first comparative example of synchronous linear motor, 202 second comparative example of synchronous linear motor

The invention claimed is:

1. A synchronous linear motor, comprising:
   a stator including a base portion and a plurality of projecting poles, the plurality of projecting poles projecting from the base portion and being formed of magnetic bodies; and
   a movable element, which is arranged opposed to the plurality of projecting poles through a space,
   wherein the plurality of projecting poles are arranged apart from one another along a moving direction of the movable element,
   wherein the movable element includes a core formed of a magnetic body, a plurality of coils, and a plurality of permanent magnets arrayed along the moving direction,
   wherein the core includes core backs and a plurality of teeth, the plurality of teeth projecting from the core backs toward the projecting poles and being arrayed along the moving direction,
   wherein the plurality of coils are at least wound around the teeth on both end sides in the moving direction,
   wherein the plurality of permanent magnets are arranged at center portions of the teeth along a projecting direction of the teeth,
   wherein a polarity of a magnetic pole of the permanent magnet is the same as a polarity of an opposed magnetic pole in an adjacent permanent magnet,
   wherein a number of different shapes of the plurality of permanent magnets is two or more,
   wherein, when the number of different shapes of the plurality of permanent magnets is two or more, the shapes of the permanent magnets vary so as to reduce a cogging thrust, and
   wherein, when the number of different shapes of the plurality of permanent magnets is two or more, a thickness in the moving direction of at least two of the permanent magnets is different from each other.

2. The synchronous linear motor according to claim 1, wherein the plurality of permanent magnets having the same shape or a same magnetic characteristic are arranged in the teeth located at positions symmetrical with respect to a center of a width of the movable element in the moving direction.

3. The synchronous linear motor according to claim 2, wherein, when the number of different shapes of the plurality of permanent magnets is two or more, a thickness in the moving direction of each of the permanent magnets arranged on both end sides of the movable element in the moving direction and a thickness in the moving direction of each of the permanent magnets arranged second from the both end sides of the movable element in the moving direction are different from each other.

4. The synchronous linear motor according to claim 2, wherein, when the number of different shapes of the plurality of permanent magnets is two or more, a width in a direction perpendicular to the moving direction and to the projecting direction of the teeth of each of the permanent magnets arranged on both end sides of the movable element in the moving direction and a width in the direction perpendicular to the moving direction and to the projecting direction of the teeth of each of the permanent magnets arranged second from the both end sides of the movable element in the moving direction are different from each other.

5. The synchronous linear motor according to claim 2, wherein, when the number of different magnetic characteristics of the plurality of permanent magnets is two or more, a residual magnetic flux density of each of the permanent magnets arranged on both end sides of the movable element in the moving direction and a residual magnetic flux density of each of the permanent magnets arranged second from the both end sides of the movable element in the moving direction are different from each other.

6. The synchronous linear motor according to claim 2, wherein, when the number of different magnetic characteristics of the plurality of permanent magnets is two or more, a magnetization ratio of each of the permanent magnets arranged on both end sides of the movable element in the moving direction and a magnetization ratio of each of the permanent magnets arranged second from the both end sides of the movable element in the moving direction are different from each other.

7. The synchronous linear motor according to claim 2, wherein a shape of each of the permanent magnets arranged on both end sides of the movable element in the moving direction is the same as a shape of each of the permanent magnets arranged second from the both end sides of the movable element in the moving direction, or a magnetic characteristic of each of the permanent magnets arranged on the both end sides of the movable element in the moving direction is the same as a magnetic characteristic of each of the permanent magnets arranged second from the both end sides of the movable element in the moving direction.

8. The synchronous linear motor according to claim 2, wherein, when the number of different shapes of the plurality of permanent magnets is three or more, a thickness in the moving direction of each of the permanent magnets arranged on both end sides of the movable elements in the moving direction, a thickness in the moving direction of each of the permanent magnets arranged second from the both end sides of the movable element in the moving direction, and a thickness in the moving direction of each of the permanent magnets arranged third from the both end sides of the movable element in the moving direction are different from one another.

9. The synchronous linear motor according to claim 2, wherein, when the number of different shapes of the plurality of permanent magnets is three or more, a width in a direction perpendicular to the moving direction of each of the permanent magnets arranged on both end sides of the movable elements in the moving direction, a width in the direction perpendicular to the moving direction of each of the permanent magnets arranged second from the both end sides of the movable element in the moving direction, and a width in the direction perpendicular to the moving direction of each of the permanent magnets arranged third from the both end sides of the movable element in the moving direction are different from one another.

10. The synchronous linear motor according to claim 2, wherein, when the number of different magnetic characteristics of the plurality of permanent magnets is three or more, a residual magnetic flux density of each of the permanent magnets arranged on both end sides of the movable element in the moving direction, a residual magnetic flux density of each of the permanent magnets arranged second from the both end sides of the movable element in the moving direction, and a residual magnetic flux density of each of the permanent magnets arranged third from the both end sides of the movable element in the moving direction are different from one another.

11. The synchronous linear motor according to claim 2, wherein, when the number of different magnetic characteristics of the plurality of permanent magnets is three or more, a magnetization ratio of each of the permanent magnets arranged on both end sides of the movable element in the moving direction, a magnetization ratio of each of the permanent magnets arranged second from the both end sides of the movable element in the moving direction, and a magnetization ratio of each of the permanent magnets arranged third from the both end sides of the movable element in the moving direction are different from one another.

12. The synchronous linear motor according to claim 1, wherein the number of the plurality of projecting poles opposed to the movable element is an integer.

13. The synchronous linear motor according to claim 1,
   wherein the core is formed of a plurality of segment cores arrayed along the moving direction, and
   wherein the plurality of segment cores each include the core back and the tooth.

14. The synchronous linear motor according to claim 13, wherein the core is divided at the core backs between the adjacent teeth.

15. The synchronous linear motor according to claim 13, wherein the core is divided at the teeth.

16. A synchronous linear motor, comprising:
   a stator including a base portion and a plurality of projecting poles, the plurality of projecting poles projecting from the base portion and being formed of magnetic bodies; and
   a movable element, which is arranged opposed to the plurality of projecting poles through a space,
   wherein the plurality of projecting poles are arranged apart from one another along a moving direction of the movable element,
   wherein the movable element includes a core formed of a magnetic body, a plurality of coils, and a plurality of permanent magnets arrayed along the moving direction,
   wherein the core includes core backs and a plurality of teeth, the plurality of teeth projecting from the core backs toward the projecting poles and being arrayed along the moving direction, wherein the plurality of coils are at least wound around the teeth on both end sides in the moving direction, wherein the plurality of permanent magnets are arranged at center portions of the teeth along a projecting direction of the teeth, wherein a polarity of a magnetic pole of the permanent magnet is the same as a polarity of an opposed magnetic pole in an adjacent permanent magnet, wherein the number of different shapes of the plurality of permanent magnets is two or more, and wherein thicknesses of the plurality of permanent magnets in a magnetization direction along the moving direction vary.

17. The synchronous linear motor according to claim 16, wherein, in a cross section including the moving direction and the projecting direction of the teeth, lengths of the permanent magnets in the projecting direction of the teeth, which are lengths of the permanent magnets opposed to the teeth in the permanent magnets having different shapes, are equal to one another.

18. The synchronous linear motor according to claim 16, wherein the plurality of permanent magnets having the same shape are arranged in the teeth located at positions symmetrical with respect to a center of a width of the movable element in the moving direction.

19. A synchronous linear motor, comprising:

a stator including a base portion and a plurality of projecting poles, the plurality of projecting poles projecting from the base portion and being formed of magnetic bodies; and a movable element, which is arranged opposed to the plurality of projecting poles through a space, wherein the plurality of projecting poles are arranged apart from one another along a moving direction of the movable element, wherein the movable element includes a core formed of a magnetic body, a plurality of coils, and a plurality of permanent magnets arrayed along the moving direction, wherein the core includes core backs and a plurality of teeth, the plurality of teeth projecting from the core backs toward the projecting poles and being arrayed along the moving direction, wherein the plurality of coils are at least wound around the teeth on both end sides in the moving direction, wherein the plurality of permanent magnets are arranged at center portions of the teeth along a projecting direction of the teeth on which the plurality of coils are wound, wherein a polarity of a magnetic pole of the permanent magnet is the same as a polarity of an opposed magnetic pole in an adjacent permanent magnet, wherein a number of different shapes of the plurality of permanent magnets arranged at center portions of the teeth on which the plurality of coils are wound, is two or more.

* * * * *